United States Patent
Numata et al.

(10) Patent No.: US 11,149,103 B2
(45) Date of Patent: *Oct. 19, 2021

(54) PHOTOPOLYMERIZATION SENSITIZER COMPOSITION AND PHOTOPOLYMERIZABLE COMPOSITION COMPRISING THE SAME

(71) Applicant: Kawasaki Kasei Chemicals Ltd., Kawasaki (JP)

(72) Inventors: Shigeaki Numata, Kawasaki (JP); Shuji Yokoyama, Kawasaki (JP); Yasuaki Miki, Kawasaki (JP); Akihiko Yamada, Kawasaki (JP)

(73) Assignee: Kawasaki Kasei Chemicals Ltd., Kawasaki (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/096,911

(22) PCT Filed: Apr. 24, 2017

(86) PCT No.: PCT/JP2017/016243
§ 371 (c)(1),
(2) Date: Oct. 26, 2018

(87) PCT Pub. No.: WO2017/188192
PCT Pub. Date: Nov. 2, 2017

(65) Prior Publication Data
US 2019/0119426 A1 Apr. 25, 2019

(30) Foreign Application Priority Data
Apr. 28, 2016 (JP) .............................. JP2016-090478

(51) Int. Cl.
*C08F 222/10* (2006.01)
*C08F 2/50* (2006.01)
*C08F 122/10* (2006.01)
*C08F 220/18* (2006.01)

(52) U.S. Cl.
CPC .......... *C08F 222/1006* (2013.01); *C08F 2/50* (2013.01); *C08F 122/1006* (2020.02); *C08F 220/18* (2013.01); *C08F 222/102* (2020.02); *C08F 2800/20* (2013.01)

(58) Field of Classification Search
CPC ............ C08F 222/1006; C08F 122/105; C08F 220/18; C08F 2222/1013; C08F 2800/20; C08F 2/50; C08F 2/44; C08F 12/08; C08F 20/18; C08K 5/12
See application file for complete search history.

(56) References Cited

U.S. PATENT DOCUMENTS

| | | | |
|---|---|---|---|
| 6,747,071 B1 * | 6/2004 | Frances ................... | A61K 6/887 522/148 |
| 7,740,482 B2 * | 6/2010 | Frances ................... | A61K 6/76 433/215 |

(Continued)

FOREIGN PATENT DOCUMENTS

| | | |
|---|---|---|
| JP | 6-59380 A | 3/1994 |
| JP | 11-140110 A | 5/1999 |
| JP | 11-279212 A | 10/1999 |
| JP | 2000-7716 A | 1/2000 |
| JP | 2001-106648 A | 4/2001 |
| JP | 2007-99637 A | 4/2007 |
| JP | 2007-204438 A | 8/2007 |
| JP | 2011-42743 A | 3/2011 |

(Continued)

OTHER PUBLICATIONS

Machine English translation of JP 2000-007716 (Year: 2000).*

(Continued)

*Primary Examiner* — Jessica M Roswell
(74) *Attorney, Agent, or Firm* — Oblon, McClelland, Maier & Neustadt, L.L.P.

(57) ABSTRACT

To provide a photopolymerizable composition which can be quickly cured by light of from 300 nm to 450 nm, and a cured product of which is less colored. A photopolymerization sensitizer composition containing a compound represented by the following formula (1) and a compound, of which the maximum value of an absorption coefficient in a wavelength region ranging from at least 400 nm to at most 500 nm is higher than the maximum value of an absorption coefficient in a wavelength region ranging from at least 400 nm to at most 500 nm of said compound; and a photopolymerizable composition containing the photopolymerization sensitizer composition. In the formula (1), $R^1$ is a $C_{1-20}$ alkyl group, a $C_{6-20}$ aryl group, a $C_{1-20}$ alkoxy group or a $C_{6-20}$ aryloxy group, and each of $X^1$ and $Y^1$ which may be the same or different, is a hydrogen atom or a $C_{1-8}$ alkyl group

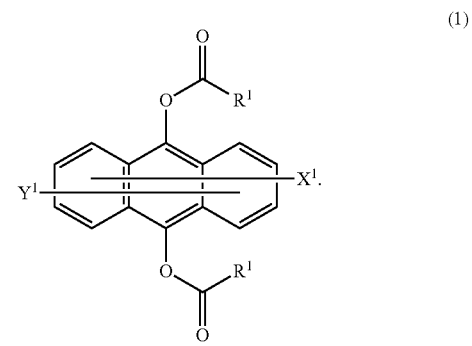

(1)

4 Claims, No Drawings

(56) References Cited

U.S. PATENT DOCUMENTS

| | | | | |
|---|---|---|---|---|
| 7,893,130 B2* | 2/2011 | Frances | ............... | A61K 6/896 |
| | | | | 523/115 |
| 2008/0090930 A1* | 4/2008 | Madhusoodhanan | ..... | C08F 2/46 |
| | | | | 522/83 |
| 2014/0272175 A1* | 9/2014 | Curatolo | ............... | C08K 3/22 |
| | | | | 427/503 |

FOREIGN PATENT DOCUMENTS

| JP | 2014-101442 A | 6/2014 |
|---|---|---|
| JP | 2014-148662 A | 8/2014 |
| JP | 2015-199815 A | 11/2015 |
| JP | 2016-84447 A | 5/2016 |

OTHER PUBLICATIONS

International Search Report dated Jun. 13, 2017 in PCT/JP2017/016243 filed Apr. 24, 2017.
J-D Cho, et al., "Material Characterisation Dual Curing of Cationic UV-Curable Clear and Pigmented Coating Systems Photosensitized by Thioxanthone and Anthracene", Polymer Testing 22 (2002) 633-645.

\* cited by examiner

PHOTOPOLYMERIZATION SENSITIZER COMPOSITION AND PHOTOPOLYMERIZABLE COMPOSITION COMPRISING THE SAME

CROSS-REFERENCE TO RELATED APPLICATIONS

This application is a National Phase of PCT/JP2017/016243, which was filed on Apr. 24, 2017. This application is based upon and claims the benefit of priority to Japanese Application No. 2016-090478, which was filed on Apr. 28, 2016.

TECHNICAL FIELD

The present invention relates to a photopolymerization sensitizer, particularly to a photopolymerization sensitizer composition comprising a specific anthracene compound and another compound having a specific relationship with the anthracene compound, and a photopolymerizable composition using the same.

BACKGROUND ART

An energy ray cured resin has been widely used in the field of coating, ink, electronic material, etc. An energy ray cured resin is obtained by irradiating a photopolymerizable composition with energy rays, for example, ultraviolet rays, electron beams, etc., to polymerize or cure the photopolymerizable composition. This technique for curing with energy rays has been used for various applications, for example, a wood coating material, a coating material for e.g. a metal, an ink for screen printing or off-set printing, a dry film resist used for an electronic substrate, a hologram material, a sealing agent, an overcoat agent, a resin for stereolithography, a bonding agent, etc.

Such a photopolymerizable composition mainly comprises a photopolymerizable compound, a photopolymerization initiator which initiates polymerization of the photopolymerizable compound by energy irradiation, and in many cases, a photopolymerization sensitizer which activates the photopolymerization initiator. From an industrial viewpoint, a photopolymerizable composition is often used, which is polymerizable by e.g. photocation polymerization, photoradical polymerization, or photohybrid polymerization using them in combination.

The photopolymerization sensitizer used in the photopolymerizable composition is usually used when polymerization by energy rays using a photopolymerization initiator is insufficient or when it is intended to facilitate polymerization further efficiently.

A photopolymerization sensitizer is often used in a case where a photopolymerizable composition contains a filler such as a dye, a pigment, a stabilizer, etc., so that the absorption wavelength of a photopolymerization initiator is shielded, or in a case where the absorption wavelength of a photopolymerization initiator does not match the wavelength of energy rays (lights) used for polymerization. In particular, in photocation polymerization, most of photocation polymerization initiators have a light absorption wavelength of about 365 nm or less, and thus polymerization did not proceed sufficiently by light irradiation with a relatively long wavelength region of e.g. about 400 nm.

In such a case, by using a photopolymerization sensitizer having light absorption on a relatively long wavelength side (in this case, in the vicinity of 400 nm), it will be possible to let polymerization proceed efficiently. As the photopolymerization sensitizer, for example, dialkoxyanthracenes, thioxanthones, etc. are known (Patent Documents 1 to 4, etc). On the other hand, while these photopolymerization sensitizers having light absorption in the vicinity of 400 nm exhibit the sensitizing effects as mentioned above, coloring is often observed in a cured product, and therefore it is difficult to use them for, in particular, optical applications and display materials. As the photopolymerization sensitizer capable of reducing such coloring, for example, diacylanthracenes (Patent Documents 5 and 6), diacyloxyanthracenes (Patent Document 7), etc. have been proposed, but there has been such a problem that they are inferior to some extent to dialkoxyanthracenes in terms of sensitivity.

PRIOR ART DOCUMENTS

Patent Documents

Patent Document 1: JP-A-H06-059380
Patent Document 2: JP-A-H11-279212
Patent Document 3: JP-A-H11-140110
Patent Document 4: JP-A-2001-106648
Patent Document 5: JP-A-2007-99637
Patent Document 6: JP-A-2007-204438
Patent Document 7: JP-A-2014-101442

DISCLOSURE OF INVENTION

Technical Problem

It is an object of the present invention to provide a photopolymerization sensitizer composition which is capable of reducing the coloring of a polymerized product or a cured product and which has a high photopolymerization sensitizing effect in a photopolymerizable composition.

Solution to Problem

The present inventors have conducted extensive studies in view of the above circumstances and as a result, found that, by using a photopolymerization sensitizer composition comprising a 9,10-bis(substituted acyloxy)anthracene compound or a 9,10-bis(substituted carbonyloxy) anthracene compound and a compound having an absorption at a specific wavelength, it is possible to obtain a photopolymerizable composition having less coloring and high sensitivity in photopolymerization, and they have accomplished the present invention. That is, the present invention has the following constructions.

(Invention 1) A photopolymerizable composition comprising (i) a photopolymerization sensitizer composition, (ii) a photopolymerization initiator and (iii) a photopolymerizable compound, wherein (i) the photopolymerization sensitizer composition comprises (A) an anthracene compound represented by the following formula (1) and (B) a compound, of which the maximum value of an absorption coefficient in a wavelength region ranging from at least 400 nm to at most 500 nm is higher than the maximum value of an absorption coefficient in a wavelength region ranging from at least 400 nm to at most 500 nm of the compound (A); (ii) the photopolymerization initiator is a photoradical polymerization initiator; and (iii) the photopolymerizable compound is a photoradical polymerizable compound:

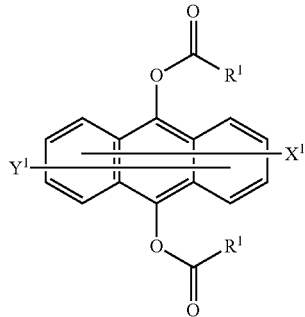

in the formula (1), $R^1$ is a $C_{1-20}$ alkyl group, a $C_{6-20}$ aryl group, a $C_{1-20}$ alkoxy group or a $C_{6-20}$ aryloxy group, and each of $X^1$ and $Y^1$ which may be the same or different, is a hydrogen atom or a $C_{1-8}$ alkyl group.

(Invention 2) The photopolymerizable composition according to Invention 1, wherein (ii) the photopolymerization initiator further contains a photocation polymerization initiator, and (iii) the photopolymerizable compound further contains a photocation polymerizable compound.

(Invention 3) The photopolymerization sensitizer composition according to Invention 1, wherein the compound (B) as defined in Invention 1 or 2 is a thioxanthone derivative or an anthracene compound represented by the following formula (2):

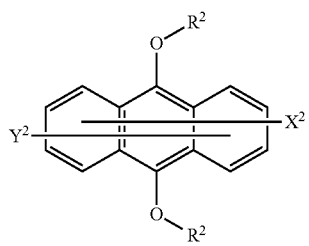

in the formula (2), $R^2$ is a linear or branched $C_{1-12}$ alkyl group which may have a substituent, and the two $R^2$ may be different from each other or the same; the substituent which may be had is any of a hydroxy group, an aryl group, a vinyl group, an alkoxy group, an aryloxy group, a halogen atom, an acetoxy group, a (meth)acryloxy group, and a glycidyl group; and in the formula (2), each of $X^2$ and $Y^2$ which may be the same or different, is any of a hydrogen atom, an alkyl group, a hydroxy group, an alkoxy group, an aryloxy group, an alkylthio group, an arylthio group, a carboxyl group, and a sulfonic acid group.

(Invention 4) A method for producing a polymer, which comprises irradiating the photopolymerizable composition as defined in any one of Inventions 1 to 3 with energy rays to obtain the polymer.

(Invention 5) The method for producing a polymer according to Invention 4, wherein the energy rays to be irradiated contain light in a wavelength region ranging from 300 nm to 500 nm.

Advantageous Effects of Invention

The photopolymerizable composition using the photopolymerization sensitizer composition of the present invention is cured by light irradiation over a wide wavelength range. Especially, it can be quickly cured by light irradiation on a long wavelength side of at least 365 nm, and the coloring of a polymerized product and a cured product can be suppressed.

The object, characteristics and advantages of the present invention will be described in detail below.

DESCRIPTION OF EMBODIMENTS (Compound (A))

The compound (A) of the present invention is (A) an anthracene compound having a structure represented by the following formula (1):

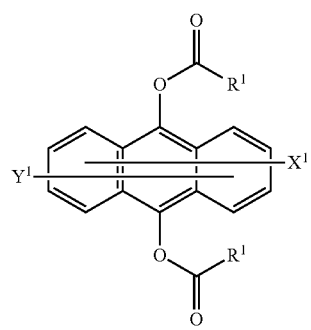

In the formula (1), $R^1$ is a $C_{1-20}$ alkyl group, a $C_{6-20}$ aryl group, a $C_{1-20}$ alkoxy group or a $C_{6-20}$ aryloxy group, and each of $X^1$ and $Y^1$ which may be the same or different, is a hydrogen atom or a $C_{1-8}$ alkyl group.

In the formula (1), the $C_{1-20}$ alkyl group as $R^1$ may be a linear, branced or cyclic alkyl group such as a methyl group, an ethyl group, a n-propyl group, an i-propyl group, a n-butyl group, an i-butyl group, a n-amyl group, an i-amyl group, a n-hexyl group, a n-heptyl group, a n-octyl group, a 2-ethylhexyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, or a n-icosyl group. The $C_{6-20}$ aryl group may, for example, be a phenyl group, a naphthyl group or an anthranyl group which may have a substituent.

The $C_{1-20}$ alkoxy group may be a linear, branched or cyclic alkoxy group such as a methoxy group, an ethoxy group, a n-propoxy group, an isopropoxy group, a n-butoxy group, an i-butoxy group, a sec-butoxy group, a tert-butoxy group, a n-pentyloxy group, a 2,2-dimethylpropoxy group, a cyclopentyloxy group, a n-hexyloxy group, a cyclohexyloxy group, a n-heptyloxy group, a 2-methylpentyloxy group, a n-octyloxy group, a 2-ethylhexyloxy group, a n-nonyloxy group, a n-decyloxy group, a n-undecyloxy group, a n-dodecyloxy group, a n-tridecyloxy group, a n-tetradecyloxy group, a n-pentadecyloxy group, a n-hexadecyloxy group, a n-heptadecyloxy group, a n-octadecyloxy group, a n-nonadecyloxy group or a n-eicosyloxy group. The $C_{6-20}$ aryloxy group may, for example, be a phenoxy group, a 1-naphthyloxy group, a 2-naphthyloxy group, a 3-phenanthryloxy group or a 2-anthryloxy group.

In the formula (1), the $C_{1-8}$ alkyl group represented by each of $X^1$ and $Y^1$ may, for example, be a methyl group, an ethyl group, a n-propyl group, an i-propyl group, a n-butyl group, an i-butyl group, a n-amyl group, an i-amyl group, a n-hexyl group, a n-heptyl group, a n-octyl group or a 2-ethylhexyl group.

Among the anthracene compounds of the present invention represented by the formula (1), a compound wherein $R^1$ is an alkyl group or an aryl group is called a 9,10-bis (substituted acyloxy)anthracene compound, and examples of which include the following compounds.

First, in a case where both $X^1$ and $Y^1$ are hydrogen atoms, 9,10-diacetyloxyanthracene, 9,10-dipropionyloxyanthracene, 9,10-bis(n-butanoyloxy)anthracene, 9,10-bis(iso-butanoyloxy)anthracene, 9,10-bis(n-pentanoyloxy)anthracene, 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(n-decanoyloxy)anthracene and 9,10-bis(n-dodecanoyloxy)anthracene may, for example, be mentioned.

Then, in a case where $X^1$ is an alkyl group and $Y^1$ is a hydrogen atom, 1-methyl-9,10-diacetyloxyanthracene, 1-methyl-9,10-dipropionyloxyanthracene, 1-methyl-9,10-bis(n-butanoyloxy)anthracene, 1-methyl-9,10-bis(iso-butanoyloxy)anthracene, 1-methyl-9,10-bis(n-hexanoyloxy) anthracene, 1-methyl-9,10-bis(n-heptanoyloxy)anthracene, 1-methyl-9,10-bis(n-octanoyloxy)anthracene, 1-methyl-9,10-bis(2-ethylhexanoyloxy)anthracene, 1-methyl-9,10-bis(n-nonanoyloxy)anthracene, 1-methyl-9,10-bis(n-decanoyloxy)anthracene, 1-methyl-9,10-bis(n-dodecanoyloxy) anthracene, 2-methyl-9,10-diacetyloxyanthracene, 2-methyl-9,10-dipropionyloxyanthracene, 2-methyl-9,10-bis(n-butanoyloxy)anthracene, 2-methyl-9,10-bis(iso-butanoyloxy)anthracene, 2-methyl-9,10-bis(n-hexanoyloxy) anthracene, 2-methyl-9,10-bis(n-heptanoyloxy)anthracene, 2-methyl-9,10-bis(n-octanoyloxy)anthracene, 2-methyl-9,10-bis(2-ethylhexanoyloxy)anthracene, 2-methyl-9,10-bis(n-nonanoyloxy)anthracene, 2-methyl-9,10-bis(n-decanoyloxy)anthracene, 2-methyl-9,10-bis(n-dodecanoyloxy) anthracene, 1-ethyl-9,10-diacetyloxyanthracene, 1-ethyl-9,10-dipropionyloxyanthracene, 1-ethyl-9,10-bis(n-butanoyloxy)anthracene, 1-ethyl-9,10-bis(iso-butanoyloxy) anthracene, 1-ethyl-9,10-bis(n-hexanoyloxy)anthracene, 1-ethyl-9,10-bis(n-heptanoyloxy)anthracene, 1-ethyl-9,10-bis(n-octanoyloxy)anthracene, 1-ethyl-9,10-bis(2-ethylhexanoyloxy)anthracene, 1-ethyl-9,10-bis(n-nonanoyloxy) anthracene, 1-ethyl-9,10-bis(n-decanoyloxy)anthracene, 1-ethyl-9,10-bis(n-dodecanoyloxy)anthracene, 2-ethyl-9,10-diacetyloxyanthracene, 2-ethyl-9,10-dipropionyloxyanthracene, 2-ethyl-9,10-bis(n-butanoyloxy)anthracene, 2-ethyl-9,10-bis(iso-butanoyloxy)anthracene, 2-ethyl-9,10-bis(n-hexanoyloxy)anthracene, 2-ethyl-9,10-bis(n-heptanoyloxy)anthracene, 2-ethyl-9,10-bis(n-octanoyloxy)anthracene, 2-ethyl-9,10-bis(2-ethylhexanoyloxy)anthracene, 2-ethyl-9,10-bis(n-nonanoyloxy)anthracene, 2-ethyl-9,10-bis(n-decanoyloxy)anthracene and 2-ethyl-9,10-bis(n-dodecanoyloxy)anthracene may, for example, be mentioned.

Further, in a case where both $X^1$ and $Y^1$ are alkyl groups, 2,3-dimethyl-9,10-diacetyloxyanthracene, 2,3-dimethyl-9,10-dipropionyloxyanthracene, 2,3-dimethyl-9,10-bis(n-butanoyloxy)anthracene, 2,3-dimethyl-9,10-bis(iso-butanoyloxy)anthracene, 2,3-dimethyl-9,10-bis(n-hexanoyloxy) anthracene, 2,3-dimethyl-9,10-bis(n-heptanoyloxy) anthracene, 2,3-dimethyl-9,10-bis(n-octanoyloxy) anthracene, 2,3-dimethyl-9,10-bis(2-ethylhexanoyloxy) anthracene, 2,3-dimethyl-9,10-bis(n-nonanoyloxy) anthracene, 2,3-dimethyl-9,10-bis(n-decanoyloxy) anthracene, 2,3-dimethyl-9,10-bis(n-dodecanoyloxy) anthracene, 2,6-dimethyl-9,10-diacetyloxyanthracene, 2,6-dimethyl-9,10-dipropionyloxyanthracene, 2,6-dimethyl-9,10-bis(n-butanoyloxy)anthracene, 2,6-dimethyl-9,10-bis(iso-butanoyloxy)anthracene, 2,6-dimethyl-9,10-bis(n-hexanoyloxy)anthracene, 2,6-dimethyl-9,10-bis(n-heptanoyloxy)anthracene, 2,6-dimethyl-9,10-bis(n-octanoyloxy)anthracene, 2,6-dimethyl-9,10-bis(2-ethylhexanoyloxy)anthracene, 2,6-dimethyl-9,10-bis(n-nonanoyloxy)anthracene, 2,6-dimethyl-9,10-bis(n-decanoyloxy)anthracene, 2,6-dimethyl-9,10-bis(n-dodecanoyloxy)anthracene, 2,7-dimethyl-9,10-diacetyloxyanthracene, 2,7-dimethyl-9,10-dipropionyloxyanthracene, 2,7-dimethyl-9,10-bis(n-butanoyloxy)anthracene, 2,7-dimethyl-9,10-bis(iso-butanoyloxy)anthracene, 2,7-dimethyl-9,10-bis(n-hexanoyloxy)anthracene, 2,7-dimethyl-9,10-bis(n-heptanoyloxy)anthracene, 2,7-dimethyl-9,10-bis(n-octanoyloxy)anthracene, 2,7-dimethyl-9,10-bis(2-ethylhexanoyloxy)anthracene, 2,7-dimethyl-9,10-bis(n-nonanoyloxy)anthracene, 2,7-dimethyl-9,10-bis(n-decanoyloxy)anthracene and 2,7-dimethyl-9,10-bis(n-dodecanoyloxy)anthracene may, for example, be mentioned.

Among the anthracene compounds of the present invention represented by the formula (1), a compound wherein $R^1$ is an alkoxy group or an aryloxy group is called a 9,10-bis (substituted carbonyloxy)anthracene compound, and examples of which include the following compounds.

First, in a case where both $X^1$ and $Y^1$ are hydrogen atoms, 9,10-bis(methoxycarbonyloxy)anthracene, 9,10-bis(ethoxycarbonyloxy)anthracene, 9,10-bis(n-propoxycarbonyloxy) anthracene, 9,10-bis(i-propoxycarbonyloxy)anthracene, 9,10-bis(n-butoxycarbonyloxy)anthracene, 9,10-bis(i-butoxycarbonyloxy)anthracene, 9,10-bis(n-pentyloxycarbonyloxy)anthracene, 9,10-bis(i-pentyloxycarbonyloxy)anthracene, 9,10-bis(n-hexyloxycarbonyloxy)anthracene, 9,10-bis (n-heptyloxycarbonyloxy)anthracene, 9,10-bis(n-octyloxycarbonyloxy)anthracene, 9,10-bis(2-ethyl hexyloxycarbonyloxy)anthracene and 9,10-bis(allyloxycarbonyloxy)anthracene may, for example, be mentioned.

In a case where $X^1$ is an alkyl group and $Y^1$ is a hydrogen atom, 1-methyl-9,10-bis(methoxycarbonyloxy)anthracene, 1-methyl-9,10-bis(ethoxycarbonyloxy)anthracene, 1-methyl-9,10-bis(n-propoxycarbonyloxy)anthracene, 1-methyl-9,10-bis(i-propoxycarbonyloxy)anthracene, 1-methyl-9,10-bis(n-butoxycarbonyloxy)anthracene, 1-methyl-9,10-bis(i-butoxycarbonyloxy)anthracene, 1-methyl-9,10-bis(n-pentyloxycarbonyloxy)anthracene, 1-methyl-9,10-bis(i-pentyloxycarbonyloxy)anthracene, 1-methyl-9,10-bis(n-hexyloxycarbonyloxy)anthracene, 1-methyl-9,10-bis(n-heptyloxycarbonyloxy)anthracene, 1-methyl-9,10-bis(n-octyloxycarbonyloxy)anthracene, 1-methyl-9,10-bis(2-ethylhexyloxycarbonyloxy)anthracene, 1-methyl-9,10-bis(allyloxycarbonyloxy)anthracene, 2-methyl-9,10-bis(methoxycarbonyloxy)anthracene, 2-methyl-9,10-bis(ethoxycarbonyloxy)anthracene, 2-methyl-9,10-bis(n-propoxycarbonyloxy)anthracene, 2-methyl-9,10-bis(i-propoxycarbonyloxy)anthracene, 2-methyl-9,10-bis(n-butoxycarbonyloxy)anthracene, 2-methyl-9,10-bis(i-butoxycarbonyloxy)anthracene, 2-methyl-9,10-bis(n-pentyloxycarbonyloxy)anthracene, 2-methyl-9,10-bis(i-pentyloxycarbonyloxy)anthracene, 2-methyl-9,10-bis(n-hexyloxycarbonyloxy)anthracene, 2-methyl-9,10-bis(n-heptyloxycarbonyloxy)anthracene, 2-methyl-9,10-bis(n-octyloxycarbonyloxy)anthracene, 2-methyl-9,10-bis(2-ethylhexyloxycarbonyloxy)anthracene, 2-methyl-9,10-bis(allyloxycarbonyloxy)anthracene, 1-ethyl-9,10-bis(methoxycarbonyloxy)anthracene, 1-ethyl-9,10-bis(ethoxycarbonyloxy)anthracene, 1-ethyl-9,10-bis(n- propoxycarbonyloxy)anthracene, 1-ethyl-9,10-bis(i-propoxycarbonyloxy)anthracene, 1-ethyl-9,10-bis(n-butoxycarbonyloxy)anthracene, 1-ethyl-9,10-bis(i-butoxycarbonyloxy)anthracene, 1-ethyl-9,10-bis(n-pentyloxycarbonyloxy)anthracene, 1-ethyl-9,10-bis(i-pentyloxycarbonyloxy)anthracene, 1-ethyl-9,10-bis(n-hexyloxycarbonyloxy)anthracene, 1-ethyl-9,10-bis(n-heptyloxycarbonyloxy)anthracene, 1-ethyl-9,10-bis(n-octyloxycarbonyloxy)anthracene, 1-ethyl-9,10-bis(2-ethylhexyloxycarbonyloxy)anthracene, 1-ethyl-9,10-bis(allyloxycarbonyloxy)anthracene, 2-ethyl-9,10-bis(methoxycarbonyloxy)anthracene, 2-ethyl-9,10-bis(ethoxycarbonyloxy)anthracene, 2-ethyl-9,10-bis(n-propoxycarbonyloxy)anthracene, 2-ethyl-9,10-bis(i-propoxycarbonyloxy)anthracene, 2-ethyl-9,10-bis(n-butoxycarbonyloxy)anthracene, 2-ethyl-9,10-bis(i-butoxycarbonyloxy)anthracene, 2-ethyl-9,10-bis(n-pentyloxycarbonyloxy)anthracene, 2-ethyl-9,10-bis(i-pentyloxycarbonyloxy)anthracene, 2-ethyl-9,10-bis(n-hexyloxycarbonyloxy)anthracene, 2-ethyl-9,10-bis(n-heptyloxycarbonyloxy)anthracene, 2-ethyl-9,10-bis(n-octyloxycarbonyloxy)anthracene, 2-ethyl-9,10-bis(2-ethylhexyloxycarbonyloxy)anthracene and 2-ethyl-9,10-bis(allyloxycarbonyloxy)anthracene may, for example, be mentioned.

And, in a case where both $X^1$ and $Y^1$ are alkyl groups, 2,3-dimethyl-9,10-bis(methoxycarbonyloxy)anthracene, 2,3-dimethyl-9,10-bis(ethoxycarbonyloxy)anthracene, 2,3-dimethyl-9,10-bis(n-propoxycarbonyloxy)anthracene, 2,3-dimethyl-9,10-bis(i-propoxycarbonyloxy)anthracene, 2,3-dimethyl-9,10-bis(n-butoxycarbonyloxy)anthracene, 2,3-dimethyl-9,10-bis(i-butoxycarbonyloxy)anthracene, 2,3-dimethyl-9,10-bis(n-pentyloxycarbonyloxy)anthracene, 2,3-dimethyl-9,10-bis(i-pentyloxycarbonyloxy)anthracene, 2,3-dimethyl-9,10-bis(n-hexyloxycarbonyloxy)anthracene, 2,3-dimethyl-9,10-bis(n-heptyloxycarbonyloxy)anthracene, 2,3-dimethyl-9,10-bis(n-octyloxycarbonyloxy)anthracene, 2,3-dimethyl-9,10-bis(2-ethylhexyloxycarbonyloxy)anthracene, 2,3-dimethyl-9,10-bis(allyloxycarbonyloxy)anthracene, 2,6-dimethyl-9,10-bis(methoxycarbonyloxy)anthracene, 2,6-dimethyl-9,10-bis(ethoxycarbonyloxy)anthracene, 2,6-dimethyl-9,10-bis(n-propoxycarbonyloxy)anthracene, 2,6-dimethyl-9,10-bis(i-propoxycarbonyloxy)anthracene, 2,6-dimethyl-9,10-bis(n-butoxycarbonyloxy)anthracene, 2,6-dimethyl-9,10-bis(i-butoxycarbonyloxy)anthracene, 2,6-dimethyl-9,10-bis(n-pentyloxycarbonyloxy)anthracene, 2,6-dimethyl-9,10-bis(i-pentyloxycarbonyloxy)anthracene, 2,6-dimethyl-9,10-bis(n-hexyloxycarbonyloxy)anthracene, 2,6-dimethyl-9,10-bis(n-heptyloxycarbonyloxy)anthracene, 2,6-dimethyl-9,10-bis(n-octyloxycarbonyloxy)anthracene, 2,6-dimethyl-9,10-bis(2-ethylhexyloxycarbonyloxy)anthracene, 2,6-dimethyl-9,10-bis(allyloxycarbonyloxy)anthracene, 2,7-dimethyl-9,10-bis(methoxycarbonyloxy)anthracene, 2,7-dimethyl-9,10-bis(ethoxycarbonyloxy)anthracene, 2,7-dimethyl-9,10-bis(n-propoxycarbonyloxy)anthracene, 2,7-dimethyl-9,10-bis(i-propoxycarbonyloxy)anthracene, 2,7-dimethyl-9,10-bis(n-butoxycarbonyloxy)anthracene, 2,7-dimethyl-9,10-bis(i-butoxycarbonyloxy)anthracene, 2,7-dimethyl-9,10-bis(n-pentyloxycarbonyloxy)anthracene, 2,7-dimethyl-9,10-bis(i-pentyloxycarbonyloxy)anthracene, 2,7-dimethyl-9,10-bis(n-hexyloxycarbonyloxy)anthracene, 2,7-dimethyl-9,10-bis(n-heptyloxycarbonyloxy)anthracene, 2,7-dimethyl-9,10-bis(n-octyloxycarbonyloxy)anthracene, 2,7-dimethyl-9,10-bis(2-ethylhexyloxycarbonyloxy)anthracene, 2,7-dimethyl-9,10-bis(allyloxycarbonyloxy)anthracene, 1,5-dimethyl-9,10-bis(methoxycarbonyloxy)anthracene, 1,5-dimethyl-9,10-bis(ethoxycarbonyloxy)anthracene, 1,5-dimethyl-9,10-bis(n-propoxycarbonyloxy)anthracene, 1,5-dimethyl-9,10-bis(i-propoxycarbonyloxy)anthracene, 1,5-dimethyl-9,10-bis(n-butoxycarbonyloxy)anthracene, 1,5-dimethyl-9,10-bis(i-butoxycarbonyloxy)anthracene, 1,5-dimethyl-9,10-bis(n-pentyloxycarbonyloxy)anthracene, 1,5-dimethyl-9,10-bis(i-pentyloxycarbonyloxy)anthracene, 1,5-dimethyl-9,10-bis(n-hexyloxycarbonyloxy)anthracene, 1,5-dimethyl-9,10-bis(n-heptyloxycarbonyloxy)anthracene, 1,5-dimethyl-9,10-bis(n-octyloxycarbonyloxy)anthracene, 1,5-dimethyl-9,10-bis(2-ethylhexyloxycarbonyloxy)anthracene and 1,5-dimethyl-9,10-bis(allyloxycarbonyloxy)anthracene may, for example, be mentioned.

Further, 2,3-diethyl-9,10-bis(methoxycarbonyloxy)anthracene, 2,3-diethyl-9,10-bis(ethoxycarbonyloxy)anthracene, 2,3-diethyl-9,10-bis(n-propoxycarbonyloxy)anthracene, 2,3-diethyl-9,10-bis(i-propoxycarbonyloxy)anthracene, 2,3-diethyl-9,10-bis(n-butoxycarbonyloxy)anthracene, 2,3-diethyl-9,10-bis(i-butoxycarbonyloxy)anthracene, 2,3-diethyl-9,10-bis(n-pentyloxycarbonyloxy)anthracene, 2,3-diethyl-9,10-bis(i-pentyloxycarbonyloxy)anthracene, 2,3-diethyl-9,10-bis(n-hexyloxycarbonyloxy)anthracene, 2,3-diethyl-9,10-bis(n-heptyloxycarbonyloxy)anthracene, 2,3-diethyl-9,10-bis(n-octyloxycarbonyloxy)anthracene, 2,3-diethyl-9,10-bis(2-ethylhexyloxycarbonyloxy)anthracene, 2,3-diethyl-9,10-bis(allyloxycarbonyloxy)anthracene, 2,6-diethyl-9,10-bis(methoxycarbonyloxy)anthracene, 2,6-diethyl-9,10-bis(ethoxycarbonyloxy)anthracene, 2,6-diethyl-9,10-bis(n-propoxycarbonyloxy)anthracene, 2,6-diethyl-9,10-bis(i-propoxycarbonyloxy)anthracene, 2,6-diethyl-9,10-bis(n-butoxycarbonyloxy)anthracene, 2,6-diethyl-9,10-bis(i-butoxycarbonyloxy)anthracene, 2,6-diethyl-9,10-bis(n-pentyloxycarbonyloxy)anthracene, 2,6-diethyl-9,10-bis(i-pentyloxycarbonyloxy)anthracene, 2,6-diethyl-9,10-bis(n-hexyloxycarbonyloxy)anthracene, 2,6-diethyl-9,10-bis(n-heptyloxycarbonyloxy)anthracene, 2,6-diethyl-9,10-bis(n-octyloxycarbonyloxy)anthracene, 2,6-diethyl-9,10-bis(2-ethylhexyloxycarbonyloxy)anthracene, 2,6-diethyl-9,10-bis(allyloxycarbonyloxy)anthracene, 2,7-diethyl-9,10-bis(methoxycarbonyloxy)anthracene, 2,7-diethyl-9,10-bis(ethoxycarbonyloxy)anthracene, 2,7-diethyl-9,10-bis(n-propoxycarbonyloxy)anthracene, 2,7-diethyl-9,10-bis(i-propoxycarbonyloxy)anthracene, 2,7-diethyl-9,10-bis(n-butoxycarbonyloxy)anthracene, 2,7-diethyl-9,10-bis(i-butoxycarbonyloxy)anthracene, 2,7-diethyl-9,10-bis(n-pentyloxycarbonyloxy)anthracene, 2,7-diethyl-9,10-bis(i-pentyloxycarbonyloxy)anthracene, 2,7-diethyl-9,10-bis(n-hexyloxycarbonyloxy)anthracene, 2,7-diethyl-9,10-bis(n-heptyloxycarbonyloxy)anthracene, 2,7-diethyl-9,10-bis(n-octyloxycarbonyloxy)anthracene, 2,7-diethyl-9,10-bis(2-ethylhexyloxycarbonyloxy)anthracene, 2,7-diethyl-9,10-bis(allyloxycarbonyloxy)anthracene, 1,5-diethyl-9,10-bis(methoxycarbonyloxy)anthracene, 1,5-diethyl-9,10-bis(ethoxycarbonyloxy)anthracene, 1,5-diethyl-9,10-bis(n-propoxycarbonyloxy)anthracene, 1,5-diethyl-9,10-bis(i-propoxycarbonyloxy)anthracene, 1,5-diethyl-9,10-bis(n-butoxycarbonyloxy)anthracene, 1,5-diethyl-9,10-bis(i-butoxycarbonyloxy)anthracene, 1,5-diethyl-9,10-bis(n-pentyloxycarbonyloxy)anthracene, 1,5-diethyl-9,10-bis(i-pentyloxycarbonyloxy)anthracene, 1,5-diethyl-9,10-bis(n-hexyloxycarbonyloxy)anthracene, 1,5-diethyl-9,10-bis(n-heptyloxycarbonyloxy)anthracene, 1,5-diethyl-9,10-bis(n-octyloxycarbonyloxy)anthracene, 1,5-diethyl-9,10-bis(2-ethylhexyloxycarbonyloxy)anthracene and 1,5-diethyl-9,10-bis(allyloxycarbonyloxy)anthracene may, for example, be mentioned.

Among the above-described specific examples of the 9,10-bis(substituted acyloxy)anthracene compound or the 9,10-bis(substituted carbonyloxy)anthracene compound, particularly in view of easiness of preparation and high performance, preferred are 9,10-diaceyloxyanthracene, 9,10-dipropionyloxyanthracene, 9,10-bis(n-butanoyloxy)anthracene, 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(methoxycarbonyloxy)anthracene, 9,10-bis(ethoxycarbonyloxy)anthracene, 9,10-bis(n-propoxycarbonyloxy)anthracene, 9,10-bis(i-propoxycarbonyloxy)anthracene, 9,10-bis(n-butoxycarbonyloxy)anthracene, 9,10-bis(i-butoxycarbonyloxy)anthracene and 9,10-bis(2-ethylhexyloxycarbonyloxy)anthracene, and in view of solubility in a solvent and a monomer, etc., more preferred are 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(methoxycarbonyloxy)anthracene, 9,10-bis(ethoxycarbonyloxy)anthracene, 9,10-bis(n-propoxycarbonyloxy)anthracene, 9,10-bis(i-propoxycarbonyloxy)anthracene, 9,10-bis(n-butoxycarbonyloxy)anthracene, 9,10-bis(i-butoxycarbonyloxy)anthracene and 9,10-bis(2-ethylhexyloxycarbonyloxy)anthracene.

The 9,10-bis(substituted acyloxy)anthracene compound or the 9,10-bis(substituted carbonyloxy)anthracene compound can be prepared according to methods disclosed in JP-A-2011-42743, etc.

(Compound (B))

In a case where the maximum value of an absorption coefficient in light absorption by irradiation with light having a wavelength region ranging from 400 nm to 500 nm is compared, a compound of which the maximum value is higher than that of a compound represented by the formula (1) is used as the compound (B) in the present invention.

As examples of such a compound, a thioxanthone derivative such as 2-chlorothioxanthone, isopropylthioxanthone or diethylthioxanthone, an aminobenzophenone such as 4,4'-bis(diethylamino) benzophenone or Michler's ketone, a diketone such as phenothiazine or camphorquinone, a condensed ring compound such as perylene or benzpyrene, and an anthracene compound represented by the formula (2) may, for example, be mentioned.

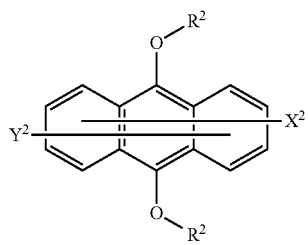

(2)

In the formula (2), $R^2$ is a linear or branched 01-12 alkyl group which may have a substituent, and the two $R^2$ may be different from each other or the same; the to substituent which may be had is any of a hydroxy group, an aryl group, a vinyl group, an alkoxy group, an aryloxy group, a halogen atom, an acetoxy group, a (meth)acryloxy group, and a glycidyl group; and in the formula (2), each of $X^2$ and $Y^2$ which may be the same or different, is any of a hydrogen atom, an alkyl group, a hydroxy group, an alkoxy group, an aryloxy group, an alkylthio group, an arylthio group, a carboxyl group, and a sulfonic acid group.

Among these compounds, a thioxanthone derivative and an anthracene compound represented by the formula (2) are preferred.

In the anthracene compound represented by the formula (2), the alkyl group which may have a substituent, represented by $R^2$, may be, for example, a methyl group, an ethyl group, a propyl group, an i-propyl group, a butyl group, an i-butyl group, a s-butyl group, an amyl group, an i-amyl group, a hexyl group, a cyclohexyl group, a heptyl group, an octyl group, a 2-ethylhexyl group, a nonyl group, a decyl group or a dodecyl group. The alkyl group which may have a substituent is preferably an ethyl group, a propyl group or a butyl group, more preferably a butyl group. An aryl group as the substituent of the alkyl group may be, for example, a phenyl group, a naphthyl group, or a tolyl group, and a vinyl group as the substituent of the alkyl group may be, for example, a vinyl group or a 2-propenyl group. An alkoxy group as the substituent of the alkyl group may be, for example, a methoxy group, an ethoxy group, a propoxy group, or a butoxy group. An aryloxy group as the substituent of the alkyl group may be, for example, a phenoxy group, a 4-methylphenoxy group, or a naphthyloxy group, and a halogen atom as the substituent of the alkyl group may be, for example, a fluorine atom, a chlorine atom, a bromine atom or an iodine atom. As the substituent of the alkyl group, a chlorine atom, an ethoxy group, or a phenoxy group is preferred, and an ethoxy group is more preferred.

In the formula (2), each of $X^2$ and $Y^2$ which may be the same or different, is any of a hydrogen atom, an alkyl group, a hydroxy group, an alkoxy group, an aryloxy group, an alkylthio group, an arylthio group, a carboxyl group, and a sulfonic acid group. In the formula (2), the alkyl group represented by $X^2$ and $Y^2$ may be, for example, a methyl group, an ethyl group, a propyl group, an i-propyl group, a butyl group, an i-butyl group, a s-butyl group, an amyl group, an i-amyl group, a hexyl group, a cyclohexyl group, a heptyl group, an octyl group, a 2-ethylhexyl group, a nonyl group, a decyl group or a dodecyl group. In the formula (2), the alkoxy group represented by $X^2$ and $Y^2$ may be, for example, a methoxy group, an ethoxy group, a propoxy group, or a butoxy group. In the formula (2), the aryloxy group represented by $X^2$ and $Y^2$ may be, for example, a phenoxy group, a p-tolyloxy group, an o-tolyloxy group, or a naphthyloxy group. In the formula (2), the alkylthio group represented by $X^2$ and $Y^2$ may be, for example, a methylthio group, an ethylthio group, a butylthio group, or a dodecylthio group. In the formula (2), the arylthio group represented by $X^2$ and $Y^2$ may be, for example, a phenylthio group, a p-tolylthio group, or a naphthylthio group. In the formula (2), as the substituent represented by $X^2$ and $Y^2$, a phenylthio group or a p-tolylthio group is preferred, and a phenylthio group is more preferred.

Representative examples of the anthracene-9,10-diether in the present invention include the following compounds. Namely, anthracene-9,10-dimethyl ether, anthracene-9,10-diethyl ether, anthracene-9,10-dipropyl ether, anthracene-9,10-dibutyl ether, anthracene-9,10-diamyl ether, anthracene-9,10-diheptyl ether, anthracene-9,10-dioctyl ether, anthracene-9,10-bis(2-ethylhexyl) ether, anthracene-9,10-didecyl ether, anthracene-9,10-bis(2-hydroxyethyl) ether, anthracene-9,10-bis(2-hydroxypropyl) ether, anthracene-9,10-bis(3-hydroxypropyl) ether, anthracene-9,10-divinyl ether, anthracene-9,10-diallyl ether, anthracene-9,10-bis(2- methoxyethyl) ether, anthracene-9,10-bis(3-methoxypropyl) ether, anthracene-9,10-bis(2-ethoxyethyl) ether, anthracene-9,10-bis(2-chloroethyl) ether, anthracene-9,10-bis(2-bromoethyl) ether, anthracene-9,10-bis(3-chloropropyl) ether, anthracene-9,10-bis(2-acetoxyethyl) ether, anthracene-9,10-bis(3-acetoxypropyl) ether, anthracene-9,10-bis(2-acetoxypropyl) ether, anthracene-9,10-bis(2-acryloxyethyl) ether, anthracene-9,10-bis(3-acryloxypropyl) ether, anthracene-9,10-bis(2-acryloxypropyl) ether, and anthracene-9,10-diglycidyl ether may, for example, be mentioned.

As other examples of the anthracene-9,10-diether compound in the present invention, 2-methylanthracene-9,10-dimethyl ether, 2-methylanthracene-9,10-diethyl ether, 2-methylanthracene-9,10-dipropyl ether, 2-methylanthracene-9,10-dibutyl ether, 2-methylanthracene-9,10-diamyl ether, 2-methylanthracene-9,10-dihexyl ether, 2-methylanthracene-9,10-diheptyl ether, 2-methylanthracene-9,10-dioctyl ether, 2-methylanthracene-9,10-bis(2-ethylhexyl) ether, 2-methylanthracene-9,10-didecyl ether, 2-methyl anthracene-9,10-didodecyl ether, 2-methyl-9,10-bis(2-hydroxyethyl) ether, 2-methylanthracene-9,10-bis(2-hydroxypropyl) ether, 2-methylanthracene-9,10-bis(3-hydroxypropyl) ether, 2-methylanthracene-9,10-divinyl ether, 2-methylanthracene-9,10-diallyl ether, 2-methylanthracene-9,10-bis(2-methoxyethyl) ether, 2-methylanthracene-9,10-bis(3-methoxypropyl) ether, 2-methylanthracene-9,10-bis(2-ethoxyethyl) ether, 2-methylanthracene-9,10-bis(2-chloroethyl) ether, 2-methylanthracene-9,10-bis(2-bromoethyl) ether, 2-methylanthracene-9,10-bis(3-chloropropyl) ether, 2-methylanthracene-9,10-bis(2-acetoxyethyl) ether, 2-methylanthracene-9,10-bis(3-acetoxypropyl) ether, 2-methylanthracene-9,10-bis(2-acetoxypropyl) ether, 2-methylanthracene-9,10-bis(2-acryloxethyl) ether, 2-methylanthracene-9,10-bis(3-acryloxypropyl) ether, 2-methylanthracene-9,10-bis(2-acryloxypropyl) ether, and 2-methylanthracene-9,10-diglycidyl ether may, for example, be mentioned.

Further, as other examples of the anthracene-9,10-diether compound in the present invention, 2-chloroanthracene-9,10-dimethyl ether, 2-chloroanthracene-9,10-diethyl ether, 2-chloroanthracene-9,10-dipropyl ether, 2-chloroanthracene-9,10-dibutyl ether, 2-chloroanthracene-9,10-diamyl ether, 2-chloroanthracene-9,10-dihexyl ether, 2-chloroanthracene-9,10-diheptyl ether, 2-chloroanthracene-9,10-dioctyl ether, 2-chloroanthracene-9,10-bis(2-ethylhexyl) ether, 2-chloroanthracene-9,10-didodecyl ether, 2-chloroanthracene-9,10-didodecyl ether, 2-chloroanthracene-9,10-bis(2-hydroxyethyl) ether, 2-chloroanthracene-9,10-bis(2-hydroxypropyl) ether, 2-chloroanthracene-9,10-bis(3-hydroxypropyl) ether, 2-chloroanthracene-9,10-divinyl ether, 2-chloroanthracene-9,10-diallyl ether, 2-chloroanthracene-9,10-bis(2-methoxyethyl) ether, 2-chloroanthracene-9,10-bis(3-methoxypropyl) ether, 2-chloroanthracene-9,10-bis(2-ethoxyethyl) ether, 2-chloroanthracene-9,10-bis(2-chloroethyl) ether, 2-chloroanthracene-9,10-bis(2-bromoethyl) ether, 2-chloroanthracene-9,10-bis(3-chloropropyl) ether, 2-chloroanthracene-9,10-bis(3-acetoxyethyl) ether, 2-chloroanthracene-9,10-bis(3-acetoxypropyl) ether, 2-chloroanthracene-9,10-bis(2-acetoxypropyl) ether, 2-chloroanthracene-9,10-bis(2-acryloxyethyl) ether, 2-chloroanthracene-9,10-bis(3-acryloxypropyl) ether, 2-chloroanthracene-9,10-bis(2-acryloxypropyl) ether, and 2-chloroanthracene-9,10-glycidyl ether may, for example, be mentioned.

Further, as other examples of the anthracene-9,10-diether compound in the present invention, 2-phenoxyanthracene-9,10-dimethyl ether, 2-phenoxyanthracene-9,10-diethyl ether, 2-phenoxyanthracene-9,10-dipropyl ether, 2-phenoxyanthracene-9,10-dibutyl ether, 2-phenoxyanthracene-9,10-diamyl ether, 2-phenoxyanthracene-9,10-dihexyl ether, 2-phenoxyanthracene-9,10-diheptyl ether, 2-phenoxyanthracene-9,10-dioctyl ether, 2-phenoxyanthracene-9,10-bis(2-ethylhexyl) ether, 2-phenoxyanthracene-9,10-didecyl ether, 2-phenoxyanthracene-9,10-didodecyl ether, 2-phenoxyanthracene-9,10-bis(2-hydroxyethyl) ether, 2-phenoxyanthracene-9,10-bis(2-hydroxypropyl) ether, 2-phenoxyanthracene-9,10-bis(3-hydroxypropyl) ether, 2-phenoxyanthracene-9,10-divinyl ether, 2-phenoxyanthracene-9,10-diallyl ether, 2-phenoxyanthracene-9,10-bis(2-methoxyethyl) ether, 2-phenoxyanthracene-9,10-bis(3-methoxypropyl) ether, 2-phenoxyanthracene-9,10-bis(2-ethoxyethyl) ether, 2-phenoxy-9,10-bis(2-chloroethyl) ether, 2-phenoxyanthracene-9,10-bis(2-bromoethyl) ether, 2-phenoxyanthracene-9,10-bis(3-chloropropyl) ether, 2-phenoxyanthracene-9,10-bis(2-acetoxyethyl) ether, 2-phenoxyanthracene-9,10-bis(3-acetoxypropyl) ether, 2-phenoxyanthracene-9,10-bis(2-acetoxypropyl) ether, 2-phenoxyanthracene-9,10-bis(2-acryloxyethyl) ether, 2-phenoxyanthracene-9,10-bis(3-acryloxypropyl) ether, 2-phenoxyanthracene-9,10-bis(2-acryloxypropyl) ether, and 2-phenoxyanthracene-9,10-glycidyl ether may, for example, be mentioned.

As other examples of the anthracene-9,10-diether compound in the present invention, 2-phenylthioanthracene-9,10-dimethyl ether, 2-phenylthioanthracene-9,10-diethyl ether, 2-phenylthioanthracene-9,10-dipropyl ether, 2-phenylthioanthracene-9,10-dibutyl ether, 2-phenylthioanthracene-9,10-diamyl ether, 2-phenylthioanthracene-9,10-dihexyl ether, 2-phenylthioanthracene-9,10-diheptyl ether, 2-phenylthioanthracene-9,10-dioctyl ether, 2-phenylthioanthracene-9,10-bis(2-ethylhexyl) ether, 2-phenylthioanthracene-9,10-decyl ether, 2-phenylthiomethyl-9,10-di-dodecyl ether, 2-phenylthioanthracene-9,10-bis(2-hydroxyethyl) ether, 2-phenylthioanthracene-9,10-bis(2-hydroxypropyl) ether, 2-phenylthioanthracene-9,10-bis(3-hydroxypropyl) ether, 2-phenylthioanthracene-9,10-divinyl ether, 2-phenylthioanthracene-9,10-diallyl ether, 2-phenylthioanthracene-9,10-bis(2-methoxyethyl) ether, 2-phenylthioanthracene-9,10-bis(3-methoxypropyl) ether, 2-phenylthioanthracene-9,10-bis(2-ethoxyethyl) ether, 2-phenylthioanthracene-9,10-bis(2-chloroethyl) ether, 2-phenylthioanthracene-9,10-bis(2-bromoethyl) ether, 2-phenylthiomethyl-9,10-bis(3-chloropropyl) ether, 2-phenylthioanthracene-9,10-bis(2-acetoxyethyl) ether, 2-phenylthioanthracene-9,10-bis(3-acetoxypropyl) ether, 2-phenylthioanthracene-9,10-bis(2-acetoxypropyl) ether, 2-phenylthioanthracene-9,10-bis(2-acryloxyethyl) ether, 2-phenylthioanthracene-9,10-bis(3-acryloxypropyl) ether, 2-phenylthioanthracene-9,10-bis(2-acryloxypropyl) ether, and 2-phenylthioanthracene-9,10-glycidyl ether may, for example, be mentioned.

As other examples of the anthracene-9,10-diether compound in the present invention, 2-carboxyanthracene-9,10-dimethyl ether, 2-carboxyanthracene-9,10-diethyl ether, 2-carboxyanthracene-9,10-dipropyl ether, 2-carboxyanthracene-9,10-dibutyl ether, 2-carboxyanthracene-9,10-diamyl ether, 2-carboxyanthracene-9,10-dihexyl ether, 2-carboxyanthracene-9,10-diheptyl ether, 2-carboxyanthracene-9,10-dioctyl ether, 2-carboxyanthracene-9,10-bis(2-ethylhexyl) ether, 2-carboxyanthracene-9,10-didecyl ether, 2-carboxyanthracene-9,10-didodecyl ether, 2-carboxyanthracene-9,10-bis(2-hydroxyethyl) ether, 2-carboxyanthracene-9,10-bis(2-hydroxypropyl) ether, 2-carboxyanthracene-9,10-bis(3-hydroxypropyl) ether, 2-carboxyanthracene-9,10-divinyl ether, 2-carboxyanthracene-9,10-diallyl ether, 2-carboxyanthracene-9,10-bis(2-methoxyethyl) ether, 2-carboxyanthracene-9,10-bis(3-methoxypropyl) ether, 2-carboxyanthracene-9,10-bis(2-ethoxyethyl) ether, 2-carboxyanthracene-9,10-bis(2-chloroethyl) ether, 2-carboxyanthracene-9,10-bis(2-bromoethyl) ether, 2-carboxyanthracene-9,10-bis(3-chloropropyl) ether, 2-carboxyanthracene-9,10-bis(2-acetoxyethyl) ether, 2-carboxyanthracene-9,10-bis(3-acetoxypropyl) ether, 2-carboxyanthracene-9,10-bis(2-acetoxypropyl) ether, 2-carboxyanthracene-9,10-bis(2-acryloxyethyl) ether, 2-carboxyanthracene-9,10-bis(3-acryloxy propyl) ether, 2-carboxyanthracene-9,10-bis(2-acryloxy propyl) ether, and 2-carboxyanthracene-9,10-glycidyl ether may, for example, be mentioned.

Among the above specific examples, anthracene-9,10-diethyl ether, anthracene-9,10-dipropyl ether and anthracene-9,10-dibutyl ether are preferable from the viewpoint of high effect, and anthracene-9,10-dibutylether is more preferred.

As the thioxanthone derivative, the following compounds may be mentioned. For example, thioxanthone, 2-isopropylthioxanthone, 2-chlorothioxanthone, 2-dodecylthioxanthone, 2-cyclohexylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-chloro-4-isopropylthioxanthone, 1-chloro-4-propoxythioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfuryl thioxanthone, 3,4-di-[2-(2-methoxyethoxy)-ethoxycarbonyl]-thioxanthone, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl) thioxanthone, 2-morpholinomethyl thioxanthone, 2-methyl-6-morpholinomethyl thioxanthone, N-allyl thioxanthone-3,4-dicarboximide, N-octyl thioxanthone-3,4-dicarboximide, N-(1,1,3,3-tetramethyl-butyl)-thioxanthone-3,4-dicarboximide, 1-phenoxythioxanthone, 6-ethoxycarbonyl-2-methoxy-thioxanthone, 6-ethoxycarbonyl-2-methylthioxanthone, thioxanthone-2-carboxylic acid polyethylene glycol ester may be mentioned. Among these compounds, 2-isopropylthioxanthone, 2,4-diethylthioxanthone, 1-chloro-4-isopropylthioxanthone, 1-chloro-4-propoxythioxanthone and 2-cyclohexylthioxanthone are particularly preferable from the viewpoint of performance and cost.

The absorption coefficient in the present invention was obtained as follows. That is, a solution having a concentration of 10 mg/L of a compound to be measured was prepared and filled in a quartz cell having an optical path length of 1 cm, and then an absorption spectrum including at least a wavelength range of from 300 nm to 700 nm was measured by an ultraviolet-visible spectrophotometer (UV-2600 manufactured by Shimadzu Corporation), and the absorption coefficient was determined from the absorbance according to the following formula.

Absorption coefficient(L/mg·cm)=Absorbance/Concentration(mg/L)

In the present invention, the amounts of the anthracene compound (A) represented by the formula (1) and the compound (B) to be used in combination with it are not particularly limited, but from the viewpoint of reducing the coloring of a polymerized product obtained by photopolymerizing a photopolymerizable composition using these compounds or its cured product, the amount of the compound (B) used is to preferably in the range not exceeding the amount of the compound (A) used.

Also, it was interestingly found that by using a very small amount of the compound (B) relative to the anthracene compound (A) represented by the formula (1) in the present invention, it is possible to further enhance an sensitizing ability of the compound (A).

In view of these, the amount of the compound (B) to be used is preferably in the range of from 0.001 wt % to 100 wt %, more preferably in the range of from 0.005 wt % to 50 wt %, relative to the compound (A). In a case where the amount of the compound (B) used is less than 0.001 wt %, the sensitivity improving effects in photopolymerization are not sufficiently exhibited, and in a case where the compound (B) is added in an amount of more than 100 wt %, it is not preferred as the coloring of the cured product is increased.

Also, as the compound (A), one compound may be used or at least two compounds may be used. Similarly, as the compound (B), one compound may be used or at least two compounds may be mixed and used.

Furthermore, the photopolymerization sensitizer composition can be used together with a photopolymerizable compound and a photopolymerization initiator as mentioned below as a component of the photopolymerizable composition. In that case, the amount of the photopolymerization sensitizer composition relative to the photopolymerizable composition in the present invention is not limited, but it is usually in the range of from 0.01 wt % to 50 wt %, preferably in the range of from 0.05 wt % to 20 wt %, based on the entire photopolymerizable composition.

In general, in the case of a compound having a large absorption for light having a wavelength of at least 400 nm, the coloring derived from an absorption tends to be large, so that the coloring of a polymerized product and a cured product of a photopolymerizable composition using the compound tends to be large. In order to reduce such coloring, it is necessary to reduce the amount of the compound used as much as possible. On the other hand, in a case where photopolymerization or photocuring is carried out by irradiation with light of a long wavelength exceeding 400 nm, it is necessary to use a compound having absorption of at least 400 nm as a photopolymerization sensitizer, and in many cases, there has been such a problem that the coloring of a cured product occurs as stated above.

In the present invention, a photopolymerization sensitizer having a small absorption at 400 nm is mainly used. On the other hand, by using a photopolymerization sensitizer having an absorption of at least 400 nm in combination, the sensitivity in long wavelength light irradiation is improved, while the amount of the photopolymerization sensitizer having an absorption of at least 400 nm may be made to be small, whereby it is possible to suppress the coloring of a cured product. Namely, the photopolymerizable composition using the photopolymerization sensitizer composition of the present invention not only can suppress the coloring of the polymerized product and the cured product, but also provides synergistic effects that cannot be provided by the addition of each of the photopolymerization sensitizers alone and has high sensitivity in a polymerization reaction by long-wavelength light irradiation.

(Photopolymerizable Compound)

As the photopolymerizable compound used in the present invention, a photoradical polymerizable compound to be subjected to photoradical polymerization is used, but also a hybrid photopolymerizable compound containing both a photoradical polymerizable compound and a photocation polymerizable compound which undergoes photocation polymerization may be used.

(Photoradical Polymerizable Compound)

The photoradical polymerizable compound used in the present invention is not particularly limited as long as it has a functional group (a radical polymerizable functional group) which can react with a radical, in the molecule. Usually, such a functional group may be a functional group containing an unsaturated bond such as a (meth)acrylic group or a vinyl group. Examples of the compound having such a functional group are as follows. At least one radical polymerizable functional group must be contained in the compound, and at least two radical polymerizable functional groups may be contained.

As examples of such a compound, methyl (meth)acrylate, ethyl (meth)acrylate, propyl (meth)acrylate, butyl (meth)acrylate, 2-ethylhydroxy (meth)acrylate, 2-hydroxypropyl (meth)acrylate, 2-ethylhexyl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, phenoxy polyethylene glycol (meth)acrylate, nonylphenoxyethyl (meth)acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexyl polyethylene glycol (meth)acrylate, nonylphenyl polypropylene glycol (meth)acrylate, methoxydipropylene glycol (meth)acrylate, glycidyl (meth)acrylate, glycerol (meth)acrylate, polyethylene glycol (meth)acrylate, polypropylene glycol (meth)acrylate, epichlorohydrin-modified butyl (meth)acrylate, epichlorohydrin-modified phenoxy (meth)acrylate, ethylene oxide (EO) modified phthalic acid (meth)acrylate, EO modified succinic acid (meth)acrylate, caprolactone-modified 2-hydroxyethyl (meth)acrylate, N, N-dimethylaminoethyl (meth)acrylate, N, N-diethylaminoethyl (meth)acrylate, morpholino (meth)acrylate, and EO-modified phosphoric acid (meth)acrylate may be, for example, be mentioned. Further, a monofunctional (meth)acrylate such as a (meth)acrylate having an imide group e.g. imide (meth)acrylate (product name: M-140, manufactured by Toagosei Co., Ltd.) may be mentioned.

Further, it may be a bifunctional (meth)acrylate such as 2,2-bis(meth)acryloyloxyphenyl) propane, 2,2-bis[4-(3-(meth)acryloyloxy)-2-hydroxypropoxyphenyl] propane, 2,2-bis(4-(meth)acryloyloxyphenyl) propane, 2,2-bis(4-(meth)acryloyloxypolyethoxyphenyl) propane, 2,2-bis(4-(meth)acryloyloxydiethoxyphenyl) propane, 2,2-bis(4-(meth)acryloyloxytetraethoxyphenyl) propane, 2,2-bis(4-(meth)acryloyloxypentaethoxyphenyl) propane, 2,2-bis(4-(meth)acryloyloxydipropoxyphenyl) propane, 2-(4-(meth)acryloxyloxydiethoxyphenyl)-2-(4-(meth) acryloyloxytriethoxyphenyl) propane, 2-(4-(meth) acryloyloxy dipropoxyphenyl)-2-(4-(meth) acryloyloxytriethoxyphenyl) propane, 2,2-bis(4-(meth) acryloyloxypropoxyphenyl) propane, 2,2-bis(4-(meth) acryloyloxyisopropoxyphenyl) propane, ethylene glycol dimethacrylate, diethylene glycol dimethacrylate, triethylene glycol di(meth)acrylate, tetraethylene glycol di(meth) acrylate, neopentyl glycol di(meth)acrylate, 1,3-butanediol di(meth)acrylate, 1,4-butanediol di(meth)acrylate, 1,6-hexanediol di(meth)acrylate, or an acrylate corresponding to this methacrylate, or 1,2-bis(3-methacryloyloxy-2-hydroxypropoxy) ethyl.

Further, it may be a (meth)acrylate having at least three functional groups such as a methacrylate (e.g. trimethylolpropane tri(meth)acrylate, trimethylol ethanetri(meth)acrylate, pentaerythritol tri(meth)acrylate or trimethylolmethane tri(meth)acrylate) or an acrylate corresponding to this methacrylate, or pentaerythritol tetra(meth)acrylate, pentaerythritol tetraacrylate, dipentaerythritol penta(meth)acrylate, dipentaerythritol hexa(meth)acrylate, glycerin tri(meth)acrylate, or tris(2-hydroxyethyl) isocyanurate tri(meth)acrylate.

Further, it may, for example, be a styrene derivative such as styrene, vinyltoluene, α-methylstyrene, chlorostyrene, styrenesulfonic acid or a salt thereof; a maleimide such as maleimide, methyl maleimide, ethyl maleimide, propyl maleimide, butyl maleimide, hexyl maleimide, octyl maleimide, dodecyl maleimide, stearyl maleimide, phenyl maleimide or cyclohexyl maleimide; a vinyl ester such as vinyl acetate, vinyl propionate, vinyl pivalate, vinyl benzoate or vinyl cinnamate; and a compound having an unsaturated bond such as an allyl compound (e.g. allyl (meth)acrylate, divinylbenzene, triallyl (iso)cyanurate, iso(tele)phthalic acid diallyl, isocyanuric acid diallyl, or maleic acid diallyl tris (2-acryloyloxyethylene) isocyanurate).

These photoradical polymerizable compounds may be used alone or in combination of two or more. Among these photoradical polymerizable compounds, a (meth)acrylate and a styrene derivative are preferred from the viewpoint of high radical polymerizability and easy availability.

(Photocation Polymerizable Compound)

The photocation polymerizable compound used in the present invention is a compound cationically polymerized with an acid such as Bronsted acid or Lewis acid. For example, a cyclic ether or a cyclic thioether including an epoxy ring, an oxetane ring, a tetrahydrofuran ring, a tetrahydropyran ring, a dioxolane ring, a dithiane ring, a trithiane ring, a dithiolane ring, etc., a thioether, a vinyl ether, lactone, etc. may be mentioned.

As the photocation polymerizable compound, a compound having one epoxy ring in the molecule such as diglycerol diether, phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, 3-vinylcyclohexene oxide, glycidyl (meth) acrylate, vinylcyclohexene oxide, 4-vinyl epoxycyclohexane, epoxyhexahydrophthalic acid dioctyl, epoxy hexahydrophthalic acid di-2-ethylhexyl; a compound having at least two epoxy rings in the molecule such as bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3',4'-epoxycyclohexylmethyl-3,4-epoxycyclohexanecarboxylate (for example, UVR 6105, UVR 6110, manufactured by Dow Corp., CELLOXIDE 2021 P manufactured by Daicel Corporation, "CELOXIDE" is a registered trademark of Daicel Corporation, etc.), 1,2-epoxy-4-vinyl cyclohexane (e.g. CELLOXIDE 2000 manufactured by Daicel Corporation), 2-(3,4-epoxycyclohexyl-5,5-spiro-3,4-epoxy) cyclohexane meta-dioxane, bis(3,4-epoxycyclohexylmethyl) adipate, bis(3,4-epoxy-6-methylcyclohexylmethyl) adipate, 3,4-epoxy-6-methylcyclohexyl-3',4'-epoxy-6'-methylcyclohexane carboxylate, methylenebis(3,4-epoxycyclohexane), dicyclopentadiene diepoxide, ethylene glycol di(3,4-epoxycyclohexylmethyl) ether, ethylenebis (3,4-epoxycyclohexanecarboxylate), 1,4-butanediol diglycidyl ether, 1,6-hexanediol diglycidyl ether, glycerin triglycidyl ether, trimethylolpropane triglycidyl ether, polyethylene glycol diglycidyl ether, a polypropylene glycol diglycidyl ether, 1,1,3-tetradecadiene dioxide, limonene dioxide, 1,2,7,8-diepoxyoctane, 1,2,5,6-diepoxy cyclooctane; a compound having an oxetane ring such as 3-ethyl-3-hydroxymethyloxetane (oxetane alcohol), 2-ethylhexyloxetane, xylylenebisoxetane, 3-ethyl-3 {[(3-ethyloxetan-3-yl) methoxy]methyl} oxetane; and a vinyl ether such as methyl vinyl ether, ethyl vinyl ether, n-propyl vinyl ether, n-butyl vinyl ether, cyclohexyl vinyl ether, isobutyl vinyl ether, 2-ethylhexyl vinyl ether, 2-hydroxyethyl vinyl ether, 4-hydroxybutyl vinyl ether, cyclohexane methanol monovinyl ether, diethylene glycol monovinyl ether, 1,4-butanediol divinyl ether, cyclohexane dimethanol divinyl ether, diethylene glycol divinyl ether, triethylene glycol divinyl ether, allyl vinyl ether, may, for example, be mentioned.

These photocation polymerizable compounds may be used alone or in combination of two or more. Among these photocation polymerizable compounds, a compound having an epoxy ring or an oxetane ring and a vinyl ether are preferred from the viewpoints of high cationic polymerizability and easy availability. In particular, a alicyclic epoxy compound such as 3',4'-epoxycyclohexylmethyl-3,4-epoxycyclohexane carboxylate is preferred.

(Photoradical Polymerization Initiator)

The photoradical polymerization initiator used in the present invention is a compound which generates a radical initiating species by light irradiation, such as a compound which decomposes by light irradiation to generate radicals or a compound such that the initiator itself is excited by light irradiation and reacts with other compounds to generate radicals.

Such a photoradical polymerization initiator may, for example, be a benzyl methyl ketal such as 2,2-dimethoxy-1,2-diphenylethan-1-one (tradename "IRGACURE 651", manufactured by BASF), an α-hydroxyalkylphenone such as 1-hydroxycyclohexyl phenyl ketone (tradename "IRGACURE 184", manufactured by BASF), 2-hydroxy-2-methyl-1-phenylpropan-1-one (tradename "DAROCUR 1173", manufactured by BASF), 1-[4-(2-hydroxyethoxy)-phenyl]-2-hydroxy-2-methyl-1-propan-1-one (tradename "IRGACURE 2959", manufactured by BASF), or 2-hydroxy-1-{4-[4-(2-hydroxy-2-methylpropionyl)-benzyl]phenyl}-2-methyl-1-one (tradename "IRGACURE 127", manufactured by BASF), an α-aminoacetophenone such as 2-methyl-1-[4-(methylthio)phenyl]-2-morpholinopropan-1-one (tradename "IRGACURE 907", manufactured by BASF) or 2-benzyl-2-dimethylamino-1-(4-morpholinophenyl)-butanone-1 (tradename "IRGACURE 369", manufactured by BASF), an acetophenone such as acetophenone, 2-hydroxy-2-phenylacetophenone, 2-ethoxy-2-phenylacetophenone, 2-methoxy-2-phenylacetophenone, 2-isopropoxy-2-phenylacetophenone or 2-isobutoxy-2-phenylacetophenone, a benzyl such as benzyl or 4,4'-dimethoxybenzyl, an anthraquinone such as 2-ethylanthraquinone or 2-t-butylanthraquinone, a phosphine oxide such as bis(2,4,6-trimethylbenzoyl)-phenylphosphine oxide or 2,4,6-trimethylbenzoyldiphenylphosphine oxide, a (keto)oxime ester such as 1,2-octanedione 1-[4-(phenylthio)-2-(o-benzoyloxime)] or 1-[9-ethyl-6-(2-methylbenzoyl)-9H-carbazol-3-yl]-1-(o-acetyloxime), a titanocene, a benzophenone, an imidazole derivative, a bisimidazole derivative, a N-arylglycine derivative, an organic azide compound, an aluminate complex, an organic peroxide, a N-alkoxypyridinium salt, a thioxanthone derivative, etc. Needless to say, it is not necessary to limit the photoradical polymerization initiator to these examples within a range not to exceed the scope of the present invention. They may be used alone or in combination of two or more.

The amount of the photoradical polymerization initiator to be used is usually within a range of from 0.001 wt % to 20 wt %, preferably within a range of from 0.01 wt % to 10 wt %, based on the photoradical polymerizable compound in the photopolymerizable composition of the present invention. They may be used alone or in combination of two or more.

(Photocation Polymerization Initiator)

The photocation polymerization initiator used in the present invention is one which generates a polymerization initiation species to the photocation polymerizable compound by light irradiation. In particular, a photoacid generator capable of generating a Bronsted acid, a Lewis acid, etc. by light irradiation is suitably used.

As examples of the photocation polymerization initiator, a sulfonic acid ester, an imide sulfonate, a dialkyl-4-hydroxysulfonium salt, an arylsulfonic acid-p-nitrobenzyl ester, a silanol-aluminum complex, and (n6-benzene)(n5-cyclopentadienyl)iron (II) may be mentioned. More specifically, benzoin tosylate, 2,5-dinitrobenzyl tosylate, and N-tosylphthalic acid imide may be mentioned.

Further, an aromatic iodonium salt, an aromatic sulfonium salt, an aromatic diazonium salt, an aromatic phosphonium salt, a triazine compound, and an iron arene complex may be mentioned. Specifically, an iodonium salt such as a chloride, bromide, borofluoride, hexafluorophosphate, hexafluoroantimonate, triflate or p-toluenesulfonate of iodonium, such as diphenyliodonium, ditolyliodonium, bis(p-tert-butylphenyl) iodonium or bis(p-chlorophenyl) iodonium; a sulfonium salt such as a chloride, bromide, borofluoride, hexafluorophosphate, hexafluoroantimonate, triflate or perfluoro-1-butanesulfonate of sulfonium, such as triphenylsulfonium, diphenyl (4-methoxyphenyl)sulfonium, (4-phenoxyphenyl) diphenylsulfonium, diphenyl(4-phenylthiophenyl) sulfonium, tris(4-tert-butylphenyl)sulfonium, tris(4-methylphenyl)sulfonium, triarylsulfonium or S,S-dialkyl-S-phenacylsulfonium; a thianslenium salt such as a chloride, bromide, borofluoride, hexafluorophosphate, hexafluoroantimonate, triflate or perfluoro-1-butanesulfonate of 5-arylthiantlethium salt; and a 2,4,6-substituted-1,3,5-triazine compound such as 2,4,6-tris(trichloromethyl)-1,3,5-triazine, 2-phenyl-4,6-bis(trichloromethyl)-1,3,5-triazine or 2-methyl-4,6-bis(trichloromethyl)-1,3,5-triazine may be mentioned, but the photocation polymerization initiator is not limited thereto.

Among the above-mentioned photocation polymerization initiators, an aromatic sulfonium salt and an aromatic iodonium salt are preferred because of their high efficiency and availability.

As examples of the aromatic sulfonium salt, S,S,S',S'-tetraphenyl-S,S'-(4,4'-thiodiphenyl)disulfonium bishexafluorophosphate, diphenyl-4-phenylthiophenylsulfonium hexafluorophosphate, and triphenylsulfonium hexafluorophosphate may be mentioned, and, for example, trade name: UVI 6992 manufactured by Dow Chemical, trade name: CPI-100P, CPI-101A, CPI-200K, and CPI-210S manufactured by San Apro Co., Ltd. and trade name: Irgacure 270 manufactured by BASF Ltd. can be used ("Irgacure" is a registered trademark of BASF). As examples of the aromatic iodonium salt, 4-isobutylphenyl-4'-methylphenyliodonium hexafluorophosphate, bis (dodecylphenyl) iodonium hexafluoroantimonate, and 4-isopropylphenyl-4'-methylphenyliodonium tetrakispentafluorophenyl borate may be mentioned, and, for example, trade name: Irgacure 250 manufactured by BASF Inc., and trade name: Rhodosil 2074 manufactured by Rhodia Co., Ltd. can be used ("Roadsill" is a registered trademark of Rhodia).

The amount of the photocation polymerization initiator to be used is not particularly limited, but it is usually in the range of from 0.001 wt % to 20 wt %, more preferably in the range of from 0.01 wt % to 10 wt %, based on the photocation polymerizable compound in the photopolymerizable composition.

The photoradical polymerization initiator and the photocation polymerization initiator may respectively be used alone, or both the photoradical polymerization initiator and the photocation polymerization initiator may be used together, if necessary.

(Other Components)

In the photopolymerizable composition of the present invention, a photopolymerizable compound having in the molecule a substituent which becomes soluble in alkali, such as a carboxyl group, a phenolic hydroxy group, or a sulfonic acid group, may be used for any of the above-mentioned photocation polymerizable compound and photoradical polymerizable compound. In a case where the polymerizable compound which becomes soluble in alkali is used, a photopolymerizable composition comprising this compound is irradiated by light through a mask having a pattern, polymerized and cured, and then alkali development is carried out to remove an unpolymerized photopolymerizable composition in the masked portion, whereby it is possible to form the pattern.

Further, to the photopolymerizable composition of the present invention, a solvent may be added as the case requires. The solvent to be used is not particularly limited and may, for example, be suitably a hydrocarbon compound such as hexane, heptane, cyclohexane or decalin, a halogenated hydrocarbon such as chloroform, carbon tetrachloride or dichloromethane, an aromatic compound such as benzene, toluene or xylene, a halogenated aromatic compound such as chlorobenzene, an ether compound such as diethyl ether, tetrahydrofuran, tetrahydropyran, dioxane, propylene glycol monomethoxyacetate or diglyme, a ketone compound such as acetone, methyl ethyl ketone, methyl isobutyl ketone or cyclohexanone, or an ester compound such as ethyl acetate or butyl acetate.

Further, in the photopolymerizable composition of the present invention, a polymerization inhibitor, a chain transfer agent, etc. regarding radical polymerization may be incorporated. The polymerization inhibitor may, for example, be a phenol such as hydroquinone, methoxyhydroquinone, t-butyl catechol or naphthohydroquinone, a quinone such as benzoquinone, naphthoquinone, anthraquinone or hydroxynaphthoquinone, 2,2,6,6-tetramethylpiperidinyl-1-oxyl (TEMPO) or 4-hydroxy-2,2,6,6-tetramethylpyperidinyl-1-oxyl.

A compound containing a sulfur atom in the molecule can be used as a component for chain transfer or copolymerization of the photoradical polymerizable compound, or as a component for reaction control of cationic polymerization or copolymerization with the photocation polymerizable compound. As examples of this compound, a mercapto compound such as butanethiol, propanethiol, hexanedithiol, decanedithiol, n-dodecylmercaptan, dodecyl(4-methylthio) phenyl ether, benzenethiol, 4-dimethyl mercaptobenzene, 2-mercaptoethanol, 1-mercapto-2-propanol, 3-mercapto-2-butanol, 3-mercapto-1,2-propanediol or mercaptophenol, or a disulfide obtained by oxidizing it, butyl thioglycolate, ethylene glycol bisthioglycolate, ethylene glycol bisthiopropionate, butanediol bis(3-mercaptoisobutyrate), 1,4-butanediol bisthioglycolate, 1,4-butanediol bisthiopropionate, octyl β-mercaptopropionate, methoxybutyl β-mercaptopropionate, trishydroxyethyl tristhiopropionate, trimethylolpropane tris(3-mercaptoisobutyrate), trimethylolpropane tris(3-mercaptobutyrate), trimethylolpropane tris(3-mercaptopropionate), trimethylolpropane tris(β-thiopropionate), trimethylolpropane tris thioglycolate, trimethylolpropane tris thiopropionate, pentaerythritol tetrakis(3-mercaptopropionate), pentaerythritol tetrakis thioglycolate, pentaerythritol tetrakis thiopropionate, thioglycolic acid, thiosalicylic acid, thiomalic acid, mercaptoacetic acid, 2-mercaptoethanesulfonic acid, 2-mercapto nicotinic acid, 2-mercaptopropionic acid, 3-mercaptopropanesulfonic acid, 3-mercaptopropionic acid, 3-mercaptobutyric acid, 4-mercaptobutanesulfonic acid, 3-[N-(2-mercaptoethyl) amino] propionic acid, 3-[N-(2-mercaptoethyl) carbamoyl] propionic acid, 2-mercapto-3-pyridinol, 2-mercaptoimidazole, 2-mercaptoethylamine, 2-mercaptobenzimidazole, 2-mercaptobenzothiazole, 6-trimercapto-s-triazine, N-(2-mercaptopropionyl) glycine, N-(3-mercaptopropionyl) alanine, diisopropyl thioxanthone, diethyl thioxanthone, a thiophosphite, or trimercaptopropionic acid tris(2-hydroxyethyl) isocyanurate may be preferably used. In addition, a halogen-containing compound such as carbon tetrachloride, carbon tetrabromide, trichlorethylene, tribromoethylene, tribromomethane, bromotrichloromethane, 3-chloro-1-propene, iodopropionic acid, iodoacetic acid, 2-iodoethanol, 2-iodoethanesulfonic acid, or 3-iodopropane sulfonic acid, an alcohol or a methacrylate, dimethylacetamide, dimethylformamide, triethylamine, α-methylstyrene dimer, or the like may be added to the photopolymerizable composition of the present invention.

In the photopolymerizable composition of the present invention, further, within a range not to impair the effects of the present invention, various resin additives such as a coloring agent such as a pigment or a dye, an organic or inorganic filler, a leveling agent, a surfactant, a defoaming agent, a thickener, a flame retardant, an antioxidant, a stabilizer, a lubricant, a plasticizer and a water repellent may be incorporated within a conventional range.

The coloring agent may, for example, be a black pigment, a yellow pigment, a red pigment, a blue pigment or a white pigment. The black pigment may, for example, be carbon black, acetylene black, lamp black or aniline black. The yellow pigment may, for example, be chrome yellow, zinc chromate, cadmium yellow, yellow iron oxide, mineral fast yellow, nickel titanium yellow, naples yellow, naphthol yellow S, hansa yellow G, hansa yellow 10G, benzidine yellow G, benzidine yellow GR, quinoline yellow lake, permanent yellow NCG or tartrazine lake. The red pigment may, for example, be red iron oxide, cadmium red, red lead, cadmium mercury sulfide, permanent red 4R, lithol red, lake red D brilliant carmine 6B, eosin lake, rhodamine lake B, alizarin lake or brilliant carmine 3B. The blue pigment may, for example, be prussian blue, cobalt blue, alkali blue lake, victoria blue lake, phthalocyanine blue, metal free phthalocyanine blue, phthalocyanine blue partial chloride, fast sky blue or indanthrene blue BC. The white pigment may, for example, be zinc oxide, titanium oxide, antimony trioxide or zinc sulfide. Other pigment may, for example, be baryta powder, barium carbonate, clay, silica, white carbon, talc or alumina white.

(Preparation of Photopolymerizable Composition)

The photopolymerizable composition of the present invention can be obtained by combining the photopolymerization sensitizer composition comprising the 9,10-bis(substituted acyloxy)anthracene compound or the 9,10-bis(substituted carbonyloxy)anthracene compound, represented by the formula (1), and the compound represented by the formula (2) or the thioxanthone derivative; the photopolymerization initiator; and the photopolymerizable compound.

As the photopolymerizable compound, the photoradical polymerizable compound may be used alone or both the photoradical polymerizable compound and the photocation polymerizable compound may be used in combination.

The photopolymerization sensitizer composition of the present invention can act as a sensitizer for both photoradical polymerization and photocation polymerization. So, by selecting an appropriate photopolymerization initiator, it will be possible to effectively polymerize the photopolymerizable composition comprising both the photoradical polymerizable compound and the photocation polymerizable compound.

The mixing ratio between the photocation polymerizable compound and the photoradical polymerizable compound is not particularly limited, and is appropriately selected according to the physical properties of a coating film or a molded article obtained by photopolymerizing and curing the composition. Usually, the composition ratio is determined in a range where the weight ratio of the photocation polymerizable compound to the photoradical polymerizable compound is from 1:99 to 99:1, preferably from 20:80 to 80:20.

One type of each of the photocation polymerizable compound and the photoradical polymerizable compound may be used or at least two types may be used in combination. In a case where at least two types of these photopolymerizable compounds are used, the mixing ratio of the photocation polymerizable compound and the photoradical polymerizable compound is considered as the ratio of the total amount of the respective photopolymerizable compounds.

As the photopolymerization initiator used in the photopolymerizable composition of the present invention, the above-mentioned photoradical initiator or photocation initiator can be used. Usually, in a case where the photoradical polymerizable compound is used as the photopolymerizable compound, a photoradical polymerization initiator may be used. Further, in a case where the photoradical polymerizable compound and the photocation polymerizable compound are used in combination as the photopolymerizable compound, a photoradical polymerization initiator or a photocation polymerization initiator may be used alone as the photopolymerization initiator, or both may be used in combination.

In particular, some of the photocation polymerization initiators generate a cationic initiation active species or a radical initiation active species. In a case where such an initiator is used, it will be possible to initiate the photopolymerization of both the photocation polymerizable compound and the photoradical polymerizable compound.

In preparing the photopolymerizable composition of the present invention, it can be obtained by weighing and putting each of the above compounds in an appropriate container or reactor such as a beaker, a flask, or a reaction tank, and stirring and mixing them suitably. It may be stirred by a stirring blade, mixed by a device such as a homogenizer, or mixed with irradiation by ultrasonic waves.

The temperature at the time of mixing is not particularly limited, but it is usually mixed in a temperature range of from about −10° C. to about 100° C., preferably from a room temperature to 50° C. If the temperature at the time of mixing is too low, the viscosity of the composition becomes too high and it cannot be mixed sufficiently. If the temperature at the time of mixing is too high, unintended volatilization, reaction, polymerization, decomposition, etc. of the photopolymerizable compound are likely to occur, which is not preferred.

A solvent may be used during mixing as the case requires. In addition, in order to prevent a photo reaction from proceeding during mixing, it may be prepared in a yellow room, a darkroom with a safety light, etc. or under an environment where light having an absorption wavelength of the photopolymerization initiator is blocked.

(Polymerization and Curing of Photopolymerizable Composition)

The photopolymerizable composition of the present invention may readily be polymerized and cured by light irradiation. Further, the photopolymerizable composition of the present invention can be polymerized and cured by various methods. For example, the photopolymerizable composition may be applied to a proper substrate or sandwiched between e.g. glass plates with a spacer interposed therebetween, and irradiated with light to obtain a coating film or a film or sheet. Further, the photopolymerizable composition may be poured into a mold which transmits light and irradiated with light to obtain a polymerized and cured formed product. Further, the photopolymerizable composition may be applied and then irradiated with light through a mask having an appropriate pattern, whereby it is polymerized and cured depending on the pattern.

Further, the photopolymerizable composition may be charged into an appropriate reactor such as a flask and irradiated with light with stirring as the case requires, whereby the photopolymerizable compound in the reactor is photopolymerized. Such polymerization by light irradiation may be carried out in an inert atmosphere or may be carried out in the atmosphere. For example, in a case where the photopolymerizable composition of the present invention contains a photoradical polymerizable compound, by conducting photopolymerization in an inert atmosphere, generated radicals will hardly be consumed by oxygen, and the polymerization efficiently proceeds in some cases. Meanwhile, in a case where the photopolymerizable composition of the present invention contains a photocation polymerizable composition, it prevents cationic species generated from being deactivated by moisture in the atmosphere, etc.

(Light Source)

As a light source used for light irradiation in the present invention, a light source which emits light having a wavelength of from 300 to 500 nm is preferably used. It may be a light source which emits light having a plurality of wavelength components or may be a light source which emits so-called monochromatic light and which employs a LED or a laser beam. Specifically, a high pressure mercury lamp, a ultrahigh pressure mercury metal halide lamp, a gallium-doped lamp, a microwave excited UV lamp (for example, H bulb, D bulb or V bulb manufactured by FUSION), or a LED lamp or a laser which emits light having a wavelength of 365 nm, 375 nm, 395 nm, 405 nm, 436 nm or the like. Sunlight or light from lighting equipment such as an incandescent lamp or a fluorescent lamp may be used.

(Application of Photopolymerizable Composition)

The photopolymerizable composition of the present invention can be used for e.g. a coating agent, a coating material, an ink or a forming material which is reacted, polymerized and cured by light irradiation. Specifically, it is applicable to a coating material to be applied on a substrate of e.g. a metal, a resin, glass, paper or wood, a coating agent or a protective film material such as a hard coating agent, an antifouling film, an antireflection film, an impact buffer film or an overcoating agent, a photocurable adhesive or bonding agent, a photo-degradative/decomposable coating material, a coating film or a formed product, an optical recording medium such as a hologram material or a material for an optical recording medium, a material for stereolithography, an ink (resin) for a 3D printer, a resist for production of an electronic circuit or a semiconductor, a resist for a color filter to be used for a display such as an organic EL display, a resist to be used for an electronic material such as a resist for a black matrix or a dry film resist, an interlayer insulating film, a protective film, a light extraction film, a sealing agent, a sealing material, an ink for printing such as screen printing, offset printing or gravure printing, a photocurable ink to be used for an ink jet printer, a composition for laser patterning, an optical member such as a lens, a lens array, an optical waveguide, a light guide plate, a light diffusion plate, a diffractive element or an optical adhesive, and a material for nanoimprinting. The photopolymerization sensitizer composition and the photopolymerizable composition of the present invention, of which a polymerized product and a cured product are hardly colored, are particularly suitable for an adhesive such as an OCA (Optically Clear Adhesive) or an OCR (Optical Clear Resin) to be used for an imaging device such as a LCD or an organic EL display, or an optical device such as a touch panel or a lens, a bonding agent, a coating agent, etc.

EXAMPLES

Now, the present invention will be described in further detail with reference to Examples. However, Examples are merely exemplified as examples. That is, the following Examples are not exhaustive nor intended to restrict the present invention as described. Accordingly, the present invention is by no means restricted to the following Examples within a range not to exceed the scope of the present invention. Further, unless otherwise specified, all the parts and percentages are based on the weight.

The yellowness in Examples indicates the degree how the hue departs from colorless or white to the yellow direction, and is as defined in JIS K7373.

In Examples, the yellowness was determined as follows. That is, using a spectrophotometer UV-2600 manufactured by SHIMADZU CORPORATION, the transmission spectrum of a cured coating film within a wavelength range of from 380 nm to 780 nm was measured, and then the yellowness was calculated by means of a hue analysis software "color measurement" manufactured by SHIMADZU CORPORATION.

The absorption coefficient of each compound was obtained as follows. That is, an acetonitrile solution having a concentration of 10 mg/L of a compound to be measured was prepared and filled in a quartz cell having an optical path length of 1 cm, and then an absorption spectrum including at least a wavelength range of from 300 nm to 700 nm was measured by an ultraviolet-visible spectrophotometer (UV-2600 manufactured by Shimadzu Corporation), and the absorption coefficient was determined from the absorbance according to the following formula.

$$\text{Absorption coefficient}(L/mg \cdot cm) = \text{Absorbance}/\text{Concentration}(mg/L)$$

Example 1

10 parts by weight of trimethylolpropane triacrylate (manufactured by Tokyo Chemical Industry Co., Ltd.), 45 parts by weight of tricyclo [5,2,1,02,6] decanedimethanol diacrylate (manufactured by Aldrich), and 45 parts by weight of isobornyl methacrylate (manufactured by Tokyo Chemical Industry Co., Ltd.), as radical polymerizable compounds; 2 parts by weight of isobutylphenyl(4-methylphenyl)iodonium hexafluorophosphate (Irgacure 250 manufactured by BASF Inc.) as a photoradical polymerization initiator; 0.5 parts by weight of 9,10-bis(n-octanoyloxy)anthracene; and 0.5 part by weight of anthracene-9,10-dibutyl ether, were mixed and dissolved at room temperature to prepare a photopolymerizable composition. This photopolymerizable composition was coated on a TAC (cellulose triacetate) film having a thickness of 100 μm by a bar coater (No. 8) to form a coating film having a thickness of about 12 μm. Thereafter, it was irradiated by LED light (50 mW/cm$^2$) having a center wavelength of 395 nm, and the irradiation time (tack free time) until the surface tackiness of the coating film disappeared was measured, which was found to be 15 seconds. The yellowness index (YI) of the cured coating film at this time was measured and found to be YI=1.71.

The maximum absorption coefficient of 9,10-bis(n-octanoyloxy)anthracene in the wavelength range of from 400 nm to 500 nm was 4.24×10$^{-3}$ (L/mg·cm), and the maximum absorption coefficient of anthracene-9,10-dibutyl ether in said wavelength range was 2.30×10$^{-2}$ (L/mg·cm).

Example 2

Except that the amount of 9,10-bis(n-octanoyloxy)anthracene in Example 1 was changed to 0.8 part by weight and the amount of anthracene-9,10-dibutyl ether in Example 1 was changed to 0.2 part by weight, a coating film was cured in the same manner as in Example 1. The tack free time at that time was 20 seconds. The yellowness index (YI) of the cured coating film at this time was measured and found to be YI=0.85.

Example 3

10 parts by weight of trimethylolpropane triacrylate (manufactured by Tokyo Chemical Industry Co., Ltd.), 45 parts by weight of tricyclo [5,2,1,02,6]decanedimethanol diacrylate (manufactured by Aldrich), and 45 parts by weight of isobornyl methacrylate (manufactured by Tokyo Chemical Industry Co., Ltd.), as radical polymerizable compounds; 2 parts by weight of isobutylphenyl(4-methylphenyl)iodonium hexafluorophosphate (Irgacure 250 manufactured by BASF Inc.) as a photoradical polymerization initiator; 0.5 parts by weight of 9,10-bis(n-octanoyloxy)anthracene; and 0.5 part by weight of 2,4-diethylthioxanthone (manufactured by Tokyo Chemical Industry Co., Ltd.) were mixed and dissolved at room temperature to prepare a photopolymerizable composition. This photopolymerizable composition was coated on a TAC (cellulose triacetate) film having a thickness of 100 μm by a bar coater (No. 8) to form a coating film having a thickness of about 12 μm. Thereafter, it was irradiated by LED light (50 mW/cm²) having a center wavelength of 395 nm, and the irradiation time (tack free time) until the surface tackiness of the coating film disappeared was measured, which was found to be 10 seconds. The yellowness index (YI) of the cured coating film at this time was measured and found to be YI=0.76.

Example 4

Except that the amount of 9,10-bis(n-octanoyloxy)anthracene in Example 3 was changed to 0.8 part by weight and the amount of 2,4-diethylthioxanthone in Example 3 was changed to 0.2 part by weight, a coating film was cured in the same manner as in Example 3. The tack free time at that time was 20 seconds. The yellowness index (YI) of the cured coating film at this time was measured and found to be YI=0.87.

Example 5

Except that the amount of 9,10-bis(n-octanoyloxy)anthracene in Example 3 was changed to 1.0 part by weight and the amount of 2,4-diethylthioxanthone in Example 3 was changed to 0.2 part by weight, a coating film was cured in the same manner as in Example 3. The tack free time at that time was 15 seconds. The yellowness index (YI) of the cured coating film at this time was measured and found to be YI=1.00.

The maximum absorption coefficient of 2,4-diethylthioxanthone in the wavelength range of from 400 nm to 500 nm was $5.80 \times 10^{-3}$ (L/mg·cm).

Example 6

100 parts by weight of trimethylolpropane triacrylate (manufactured by Tokyo Chemical Industry Co., Ltd.) as a radical polymerizable compound; 1 part by weight of 2-methyl-1-[4-(methylthio)phenyl]-2-morpholinopropane-1-one (Irgacure 907 manufactured by BASF Inc.) as a photoradical polymerization initiator; 0.5 parts by weight of 9,10-bis(n-octanoyloxy)anthracene; and 0.5 parts by weight of anthracene-9,10-dibutyl ether, were mixed and dissolved at room temperature to prepare a photopolymerizable composition. This photopolymerizable composition was coated on a TAC (cellulose triacetate) film having a thickness of 100 μm by a bar coater (No. 8) to form a coating film having a thickness of about 12 μm. Thereafter, it was irradiated by a LED light (50 mW/cm²) having a center wavelength of 395 nm, and the irradiation time (tack free time) until the surface tackiness of the coating film disappeared was measured, which was found to be 2 seconds. The yellowness index (YI) of the cured coating film at this time was measured and found to be YI=0.55.

Comparative Example 1

10 parts by weight of trimethylolpropane triacrylate (manufactured by Tokyo Chemical Industry Co., Ltd.), 45 parts by weight of tricyclo [5,2,1,02,6]decanedimethanol diacrylate (manufactured by Aldrich), and 45 parts by weight of isobornyl methacrylate (manufactured by Tokyo Chemical Industry Co., Ltd.), as radical polymerizable compounds; 2 parts by weight of isobutylphenyl(4-methylphenyl)iodonium hexafluorophosphate (Irgacure 250 manufactured by BASF Inc.) as a photoradical polymerization initiator; and 1.0 part by weight of anthracene-9,10-dibutyl ether, were mixed and dissolved at room temperature to prepare a photopolymerizable composition. This photopolymerizable composition was coated on a TAC (cellulose triacetate) film having a thickness of 100 μm by a bar coater (No. 8) to form a coating film having a thickness of about 12 μm. Thereafter, it was irradiated by LED light (50 mW/cm²) having a center wavelength of 395 nm, and the irradiation time (tack free time) until the surface tackiness of the coating film disappears was measured, which was found to be 10 seconds. The yellowness index (YI) of the cured coating film at this time was measured and found to be YI=2.36.

Comparative Example 2

Except that a photopolymerizable composition, in which anthracene-9,10-dibutyl ether in Comparative Example 1 was changed to 9,10-bis(n-octanoyloxy)anthracene, was used, a coating film was cured in the same manner as in Comparative Example 1. The tack free time at that time was 40 seconds. The yellowness index (YI) of the cured coating film at this time was measured and found to be YI=1.16.

Comparative Example 3

Except that a photopolymerizable composition, in which anthracene-9,10-dibutyl ether in Comparative Example 1 was changed to 2,4-diethylthioxanthone (manufactured by Tokyo Chemical Industry Co., Ltd.), was used, a coating film was cured in the same manner as in Comparative Example 1. The tack free time at that time was 10 seconds. The yellowness index (YI) of the cured coating film at this time was measured and found to be YI=2.05.

Comparative Example 4

100 parts by weight of trimethylolpropane triacrylate (manufactured by Tokyo Chemical Industry Co., Ltd.) as a radical polymerizable compound; 1 parts by weight of isobutylphenyl(4-methylphenyl)iodonium hexafluorophosphate (Irgacure 907 manufactured by BASF Inc.) as a photoradical polymerization initiator; and 1.0 parts by weight of 2,4-diethylthioxanthone (manufactured by Tokyo Chemical Industry Co., Ltd.), were mixed and dissolved at room temperature to prepare a photopolymerizable composition. This photopolymerizable composition was coated on a TAC (cellulose triacetate) film having a thickness of 100 μm by a bar coater (No. 8) to form a coating film having a thickness of about 12 μm. Thereafter, it was irradiated by LED light (50 mW/cm²) having a center wavelength of 395 nm, and the irradiation time (tack free time) until the surface tackiness of the coating film disappears was measured, which was found to be 1 seconds. The yellowness index (YI) of the cured coating film at this time was measured and found to be YI=0.77.

Comparative Example 5

Except that a photopolymerizable composition, in which 2,4-diethylthioxanthone in Comparative Example 4 was changed to 9,10-bis(n-octanoyloxy)anthracene, was used, a coating film was cured in the same manner as in Comparative Example 1. The tack free time at that time was 4 seconds. The yellowness index (YI) of the cured coating film at this time was measured and found to be YI=0.30.

As is apparent from the comparison between Examples 1 to 3 and Comparative Examples 1 and 2, it can be seen that, by adding a small amount of anthracene-9,10-dibutyl ether of the compound (B) to 9,10-bis (n-octanoyloxy) anthracene of the compound (A) as the photopolymerization sensitizer composition, the curing rate (tack free time) of the photopolymerizable composition dramatically improves. From this, it can be seen that there is a synergistic effect between the compound (A) and the compound (B). It can be also seen from the comparison between Examples 4 to 6 and Comparative Examples 3 to 5 that the same applies to a case where 2,4-diethylthioxanthone is used as the compound (B). On the other hand, as can be seen from Comparative Example 1 and Comparative Example 4, in a case where the compound (B) is used alone, the cured product of the photopolymerizable composition has high yellowness and the coloring is intense. Further, as can be seen from the results of Examples 1 to 4, in a case where the photopolymerization sensitizer composition in which the compound (B) is added to the compound (A) is used, regardless of the fact that the compound (B) is added, the yellowness is almost similar as compared to a case where the compound (B) was not added. From this, it is understood that the photopolymerization sensitizer composition of the present invention can suppress the coloring while improving the curing rate of the photopolymerizable composition using it.

INDUSTRIAL APPLICABILITY

The photopolymerizable composition comprising the photopolymerization sensitizer composition comprising (A) the anthracene compound represented by the formula (1) and (B) the compound, of which the maximum value of an absorption coefficient in a wavelength region ranging from at least 400 nm to at most 500 nm is higher than the maximum value of an absorption coefficient in a wavelength region ranging from at least 400 nm to at most 500 nm of the compound (A), the photoradical polymerization initiator and the photoradical polymerizable compound, as defined in the present invention, is an industrially very useful photopolymerizable composition which can be quickly cured by light having a wavelength within a range of from 300 nm to 450 nm, and a cured product of which is less colored.

The invention claimed is:
1. A photopolymerizable composition, comprising:
   (i) a photopolymerization sensitizer composition;
   (ii) a photopolymerization initiator; and
   (iii) a photopolymerizable compound, wherein:
   the photopolymerization sensitizer composition comprises:
      (A) an anthracene compound of formula (1):

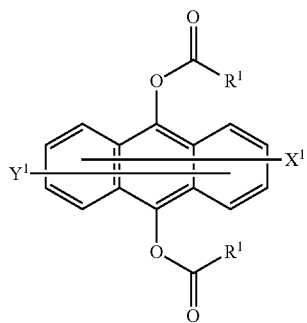

(1)

$R^1$ is a $C_{1-20}$ alkyl group, a $C_{6-20}$ aryl group, a $C_{1-20}$ alkoxy group or a $C_{6-20}$ aryloxy group;

each of $X^1$ and $Y^1$ is independently a hydrogen atom or a $C_{1-8}$ alkyl group; and (B) a compound having a maximum value of an absorption coefficient, in a wavelength region ranging from at least 400 nm to at most 500 nm, that is higher than a maximum value of an absorption coefficient of the anthracene compound (A), in the wavelength region ranging from at least 400 nm to at most 500 nm, wherein the compound (B) is a thioxanthone derivative or an anthracene compound of formula (2):

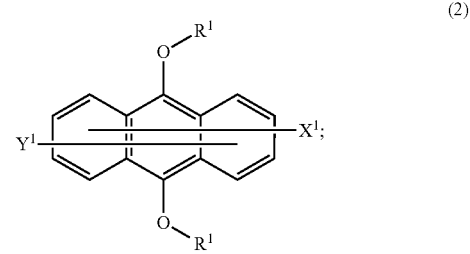

(2)

$R^2$ is independently a linear or branched $C_{1-12}$ alkyl group which may have a substituent;

the substituent, when present, is any of a hydroxy group, an aryl group, a vinyl group, an alkoxy group, an aryloxy group, a halogen atom, an acetoxy group, a (meth)acryloxy group, and a glycidyl group; and each of $X^2$ and $Y^2$, which may be the same or different, is any of a hydrogen atom, an alkyl group, a hydroxy group, an alkoxy group, an aryloxy group, an alkylthio group, an arylthio group, a carboxyl group, and a sulfonic acid group;

the photopolymerization initiator comprises a photoradical polymerization initiator;

the photopolymerizable compound comprises a photoradical polymerizable compound;

the photopolymerization composition does not contain a photocation polymerization initiator, and the photopolymerization composition is not a cationically polymerizable composition.

2. A method for producing a polymer, the method comprising:
   irradiating the photopolymerizable composition of claim 1 with energy rays to obtain the polymer.

3. The method according to claim 2, wherein the energy rays comprise light in a wavelength region ranging from 300 nm to 500 nm.

4. The photopolymerizable composition according to claim 1, wherein the photopolymerization initiator does not include a benzophenone.

* * * * *